United States Patent
Kondo et al.

(10) Patent No.: US 12,500,389 B2
(45) Date of Patent: Dec. 16, 2025

(54) LIGHT-EMITTING COMPONENT, LIGHT-EMITTING ELEMENT ARRAY CHIP, AND OPTICAL MEASUREMENT APPARATUS

(71) Applicant: FUJIFILM Business Innovation Corp., Tokyo (JP)

(72) Inventors: Takashi Kondo, Kanagawa (JP); Kenichi Ono, Kanagawa (JP); Junichiro Hayakawa, Kanagawa (JP); Takafumi Higuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 1161 days.

(21) Appl. No.: 17/401,848

(22) Filed: Aug. 13, 2021

(65) Prior Publication Data
US 2022/0344901 A1 Oct. 27, 2022

(30) Foreign Application Priority Data
Apr. 26, 2021 (JP) ................. 2021-074494

(51) Int. Cl.
*H01S 5/042* (2006.01)
*G01S 7/481* (2006.01)
*H01S 5/42* (2006.01)

(52) U.S. Cl.
CPC ........ *H01S 5/04256* (2019.08); *G01S 7/4815* (2013.01); *H01S 5/423* (2013.01)

(58) Field of Classification Search
CPC ..................................................... H01S 5/423
See application file for complete search history.

(56) References Cited

U.S. PATENT DOCUMENTS

| 7,948,004 B2 | 5/2011 | Suzuki |
| 10,477,635 B1 | 11/2019 | Kondo |
| 11,050,217 B2 | 6/2021 | Kondo et al. |
| 2005/0018730 A1* | 1/2005 | Taylor ................. H01S 5/18313 372/50.1 |

(Continued)

FOREIGN PATENT DOCUMENTS

| JP | H01-238962 A | 9/1989 |
| JP | 2003-324251 A | 11/2003 |
| JP | 2005-44964 A | 2/2005 |

(Continued)

OTHER PUBLICATIONS

Aug. 27, 2024 Office Action issued in Japanese Patent Application No. 2021-074494.

(Continued)

*Primary Examiner* — Minsun O Harvey
*Assistant Examiner* — Stephen Sutton Kotter
(74) *Attorney, Agent, or Firm* — Oliff PLC

(57) ABSTRACT

A light-emitting component includes a substrate and plural light-emitting elements that are disposed on the substrate and emit light in a direction intersecting with a surface of the substrate and that are switched ON/OFF together. The plural light-emitting elements include a gate layer, the gate layer performing control so that the plural light-emitting elements are switched ON/OFF together, a film thickness of the gate layer being greater than a wavelength of light emitted from the plural light-emitting elements.

14 Claims, 11 Drawing Sheets

(56) References Cited

U.S. PATENT DOCUMENTS

2018/0241173 A1* 8/2018 Taylor .................. H01S 5/2063
2019/0373693 A1* 12/2019 Kondo .................. H05B 45/00

FOREIGN PATENT DOCUMENTS

| JP | 2009-286048 A | 12/2009 |
| JP | 2011-155219 A | 8/2011 |
| JP | 2019-57648 A | 4/2019 |
| JP | 2019-212742 A | 12/2019 |
| JP | 2020-120018 A | 8/2020 |

OTHER PUBLICATIONS

Jan. 28, 2025 English Translation of Office Action issued in Japanese Patent Application No. 2021-074494.

* cited by examiner

LIGHT-EMITTING COMPONENT, LIGHT-EMITTING ELEMENT ARRAY CHIP, AND OPTICAL MEASUREMENT APPARATUS

CROSS-REFERENCE TO RELATED APPLICATIONS

This application is based on and claims priority under 35 USC 119 from Japanese Patent Application No. 2021-074494 filed Apr. 26, 2021.

BACKGROUND

(i) Technical Field

The present disclosure relates to a light-emitting component, a light-emitting element array chip, and an optical measurement apparatus.

(ii) Related Art

Japanese Unexamined Patent Application Publication No. 1-238962 discloses the following light-emitting element array. Multiple light-emitting elements whose threshold voltages or threshold currents can be controlled from an external source are arranged linearly, two-dimensionally, or three-dimensionally. Electrodes for controlling the threshold voltages or the threshold currents of the individual light-emitting elements are electrically connected with each other. Clock lines are connected to the corresponding light-emitting elements so as to apply a voltage or a current from an external source to the light-emitting elements.

Japanese Unexamined Patent Application Publication No. 2009-286048 discloses the following self-scanning light source head. The self-scanning light source head includes a substrate, surface-emitting semiconductor lasers, and thyristors. The surface-emitting semiconductor lasers are disposed on the substrate in an array. The thyristors are disposed on the substrate and serve as switching elements for selectively turning ON/OFF the light emission of the surface-emitting semiconductor lasers.

SUMMARY

In three-dimensional (3D) sensing, a light-emitting unit using a light-emitting element head including multiple light-emitting elements is utilized. These individual light-emitting elements may be formed, not as an individual light-emitting element, but as a light-emitting element array, and are operated to be ON/OFF in synchronization with each other. In this case, the multiple light-emitting elements formed into an array may be constructed in a structure in which they can be operated in synchronization with each other.

Aspects of non-limiting embodiments of the present disclosure relate to a light-emitting component, a light-emitting element array chip, and an optical measurement apparatus in which multiple light-emitting elements formed into an array can be operated to be ON/OFF in synchronization with each other.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a light-emitting component including a substrate and plural light-emitting elements that are disposed on the substrate and emit light in a direction intersecting with a surface of the substrate and that are switched ON/OFF together, wherein the plural light-emitting elements include a gate layer, the gate layer performing control so that the plural light-emitting elements are switched ON/OFF together, a film thickness of the gate layer being greater than a wavelength of light emitted from the plural light-emitting elements.

BRIEF DESCRIPTION OF THE DRAWINGS

An exemplary embodiment of the present disclosure will be described in detail based on the following figures, wherein.

DETAILED DESCRIPTION

An exemplary embodiment of the disclosure will be described below in detail with reference to the accompanying drawings. Hereinafter, chemical elements will simply be represented by element symbols. For example, aluminum is designated by Al.

A light-emitting component 10 will first be described below. The light-emitting component 10 of the exemplary embodiment includes multiple vertical cavity surface emitting lasers (VCSELs) disposed in a row on the front surface of a substrate 80 formed in a rectangular shape.

(Circuit Configuration of Light-Emitting Component 10)

Figure 1:
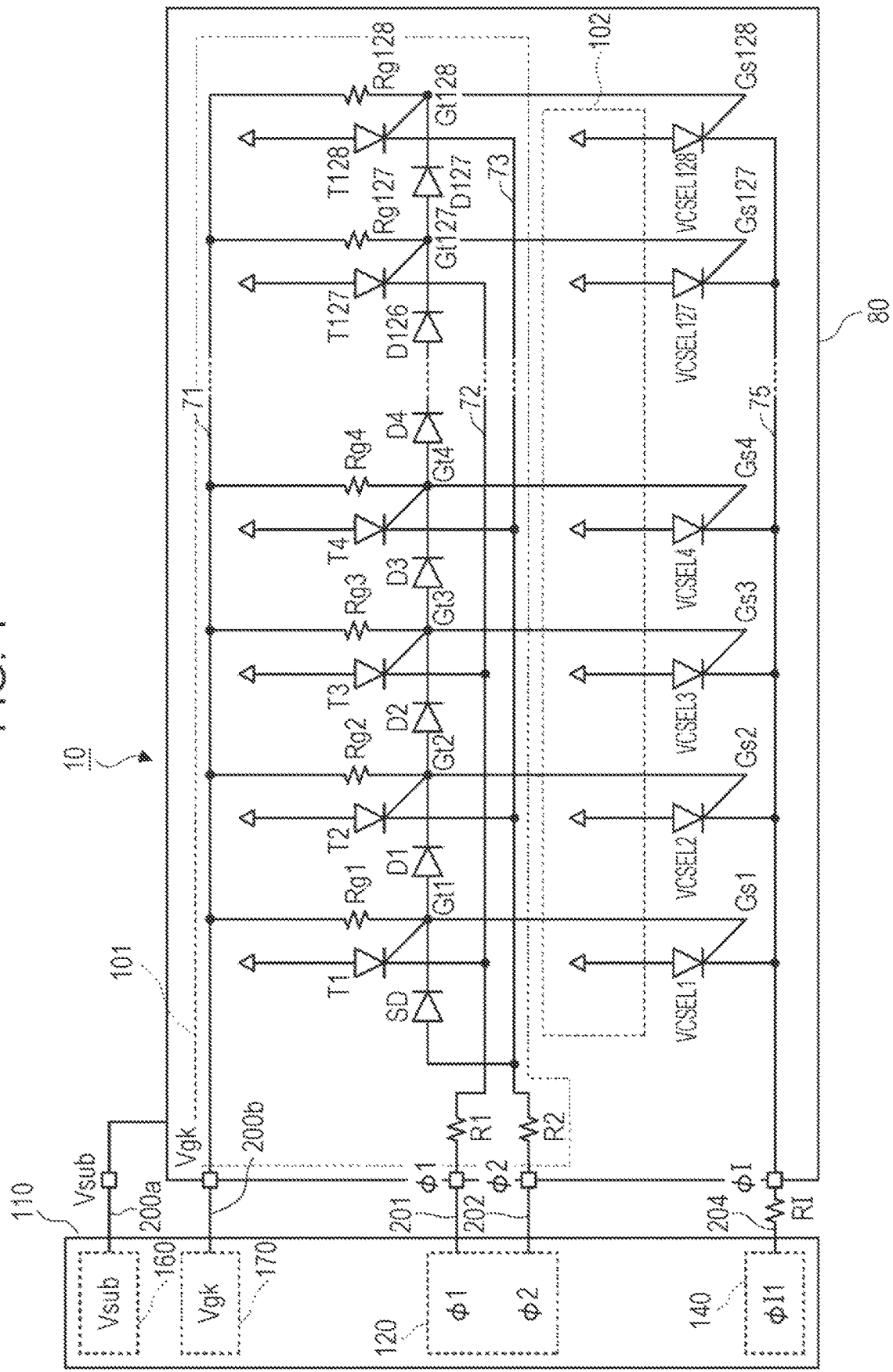
FIG. 1 is an equivalent circuit diagram illustrating the circuit configuration of a light-emitting component.

FIG. 1 is an equivalent circuit diagram illustrating the circuit configuration of the light-emitting component 10. Elements described below are disposed based on the layout of the light-emitting component 10 shown in FIGS. 2A and 2B, except for terminals (φ1 terminal, φ2 terminal, Vgk terminal, and φI terminal). A Vsub terminal provided on the back surface of the substrate 80 is shown outside the substrate 80.

The light-emitting component 10 includes a light-emitting portion 102 constituted by VCSEL1 through VCSEL128.

The light-emitting component 10 also includes transfer thyristors T1 through T128, which are also arranged in a row, as in the VCSEL1 through VCSEL128. The transfer thyristors T1 through T128 will simply be called the transfer thyristors T unless it is necessary to distinguish them from each other.

The transfer thyristors T are used as an example of transfer elements. However, another type of circuit elements may be used if they are sequentially turned ON. For example, a shift register or circuit elements formed by a combination of multiple transistors may be used.

The light-emitting component 10 also includes coupling diodes D1 through D127 (simply called the coupling diodes D unless it is necessary to distinguish them from each other). The coupling diodes D1 through D127 are arranged in the following manner. The transfer thyristors T1 through T128 are divided into pairs in numerical order and the coupling diodes D1 through D127 are each disposed between the transfer thyristors T of the corresponding pair.

The light-emitting component 10 also includes power supply line resistors Rg1 through Rg128 (simply called the power supply line resistors Rg unless it is necessary to distinguish them from each other).

The light-emitting component 10 also includes a start diode SD and current limiting resistors R1 and R2. The current limiting resistor R1 prevents an excessive current from flowing through a first transfer signal line 72 through which a first transfer signal φ1 is transmitted, while the current limiting resistor R2 prevents an excessive current from flowing through a second transfer signal line 73 through which a second transfer signal φ2 is transmitted.

The transfer thyristors T1 through T128, power supply line resistors Rg1 through Rg128, coupling diodes D1 through D127, start diode SD, and current limiting resistors R1 and R2 form a drive portion 101.

Figure 2B:
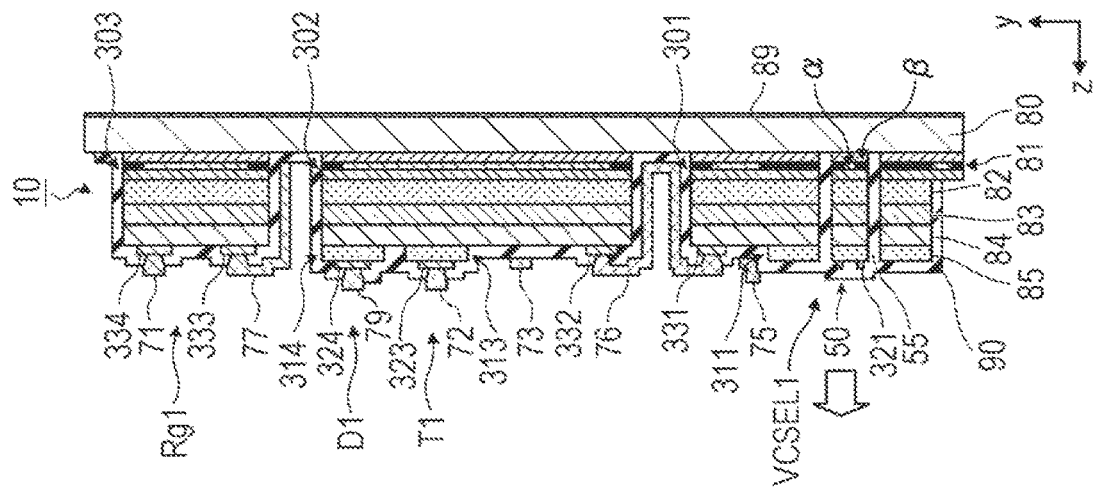
FIG. 2B is a sectional view taken along line IIB-IIB in FIG. 2A.

As shown in FIG. 2B, which will be explained later, the VCSEL1 through VCSEL128, transfer thyristors T1 through T128, power supply line resistors Rg1 through Rg128, coupling diodes D1 through D127, start diode SD, and current limiting resistors R1 and R2 are arranged in rows on the substrate 80.

The VCSEL1 through VCSEL128 of the light-emitting portion 102 and the transfer thyristors T1 through T128 of the drive portion 101 are shown in numerical order from the left side of FIG. 1. The coupling diodes D1 through D127 and the power supply line resistors Rg1 through Rg128 are also shown in numerical order from the left side of FIG. 1.

In the exemplary embodiment, the number of VCSELs of the light-emitting portion 102 and the numbers of transfer thyristors T and power supply line resistors Rg of the drive portion 101 are all 128. The number of coupling diodes D is 127, which is one less than the number of transfer thyristors T.

However, the above-described numbers are only examples, and a predetermined number of each of the above-described elements may be set. The number of transfer thyristors T may be greater than that of VCSELs.

Each of the coupling diodes D and start diode SD is a semiconductor element having a diode structure with two terminals, that is, an anode terminal (anode) and a cathode terminal (cathode). Each of the VCSELs and the transfer thyristors T is a semiconductor element having a thyristor structure with three terminals, that is, an anode terminal (anode), a gate terminal (gate), and a cathode terminal (cathode).

The VCSELs, coupling diodes D, start diode SD, and transfer thyristors T do not necessarily have an anode terminal, a gate terminal, and a cathode terminal formed as electrodes. Hereinafter, the anode terminal, gate terminal, and cathode terminal may thus be called an anode, a gate, and a cathode, respectively.

Electrical connection between the individual elements of the light-emitting component 10 will be discussed below.

The anodes of the VCSELs and the transfer thyristors T are connected to the substrate 80 of the light-emitting component 10 (common anode).

These anodes are connected to a power supply line 200a via a back-surface electrode 89 (see FIG. 2B), which serves as a Vsub terminal, provided on the back surface of the substrate 80. The power supply line 200a receives a reference potential Vsub from a reference potential supplier 160.

The above-described electrical connection mode is applicable when a p-type substrate is used as the substrate 80. If an n-type substrate is used as the substrate 80, the above-described polarities are reversed. If an intrinsic (i) substrate without impurities is used as the substrate 80, a terminal to be connected to the power supply line 200a for supplying the reference potential Vsub is provided on the side of the substrate 80 on which the drive portion 101 and the light-emitting portion 102 are formed.

In accordance with the arrangement of the transfer thyristors T, the cathodes of the odd-numbered transfer thyristors T1, T3, . . . are connected to the first transfer signal line 72. The first transfer signal line 72 is connected to a φ1 terminal via the current limiting resistor R1. A first transfer signal line 201 is connected to the φ1 terminal, and the first transfer signal φ1 is sent from a transfer signal generator 120 to the φ1 terminal via the first transfer signal line 201.

In accordance with the arrangement of the transfer thyristors T, the cathodes of the even-numbered transfer thyristors T2, T4, . . . are connected to the second transfer signal line 73. The second transfer signal line 73 is connected to a φ2 terminal via the current limiting resistor R2. A second transfer signal line 202 is connected to the φ2 terminal, and the second transfer signal φ2 is sent from the transfer signal generator 120 to the φ2 terminal via the second transfer signal line 202.

The cathodes of the VCSEL1 through VCSEL128 are connected to an ON signal line 75. The ON signal line 75 is connected to a φ1 terminal. In the light-emitting component 10, the φ1 terminal is connected to an ON signal line 204 via a current limiting resistor RI provided outside the light-emitting component 10, and an ON signal φI1 is sent from an ON signal generator 140 to the φ1 terminal via the ON signal line 204. The ON signal φI1 supplies a current to the φ1 terminal to turn ON the VCSEL1 through VCSEL128.

Gates Gt1 through Gt128 (simply called gates Gt unless it is necessary to distinguish them from each other) of the transfer thyristors T1 through T128 are respectively connected to gates Gs1 through Gs128 (simply called gates Gs unless it is necessary to distinguish them from each other) of the VCSEL1 through VCSEL128 based on a one-on-one correspondence. Accordingly, the gate Gt and the gate Gs having the same number are electrically at the same potential. For example, the gate Gt1 (gate Gs1) indicates that the gates Gt1 and Gs1 are at the same potential.

The gates Gt1 through Gt128 of the transfer thyristors T1 through T128 are divided into pairs in numerical order, and the coupling diodes D1 through D127 are each connected between the gates Gt of the corresponding pair. That is, the coupling diodes D1 through D127 are connected in series with each other so that they are each sandwiched between the gates Gt of the corresponding pair. The coupling diode D1 is connected in the direction in which a current flows from the gate Gt1 to the gate Gt2. The other coupling diodes D2 through D127 are connected in a similar manner.

The gates Gt (gates Gs) of the transfer thyristors T are connected to a power supply line 71 via the power supply line resistors Rg provided for the respective transfer thyristors T. The power supply line 71 is connected to a Vgk terminal. A power supply line 200b is connected to the Vgk terminal, and a power supply potential Vgk is supplied from a power supply potential supplier 170 to the Vgk terminal via the power supply line 200b.

The gate Gt1 of the transfer thyristor T1 is connected to the cathode of the start diode SD. The anode of the start diode SD is connected to the second transfer signal line 73.

(Specific Configuration of Light-Emitting Component 10)

Figure 2A:
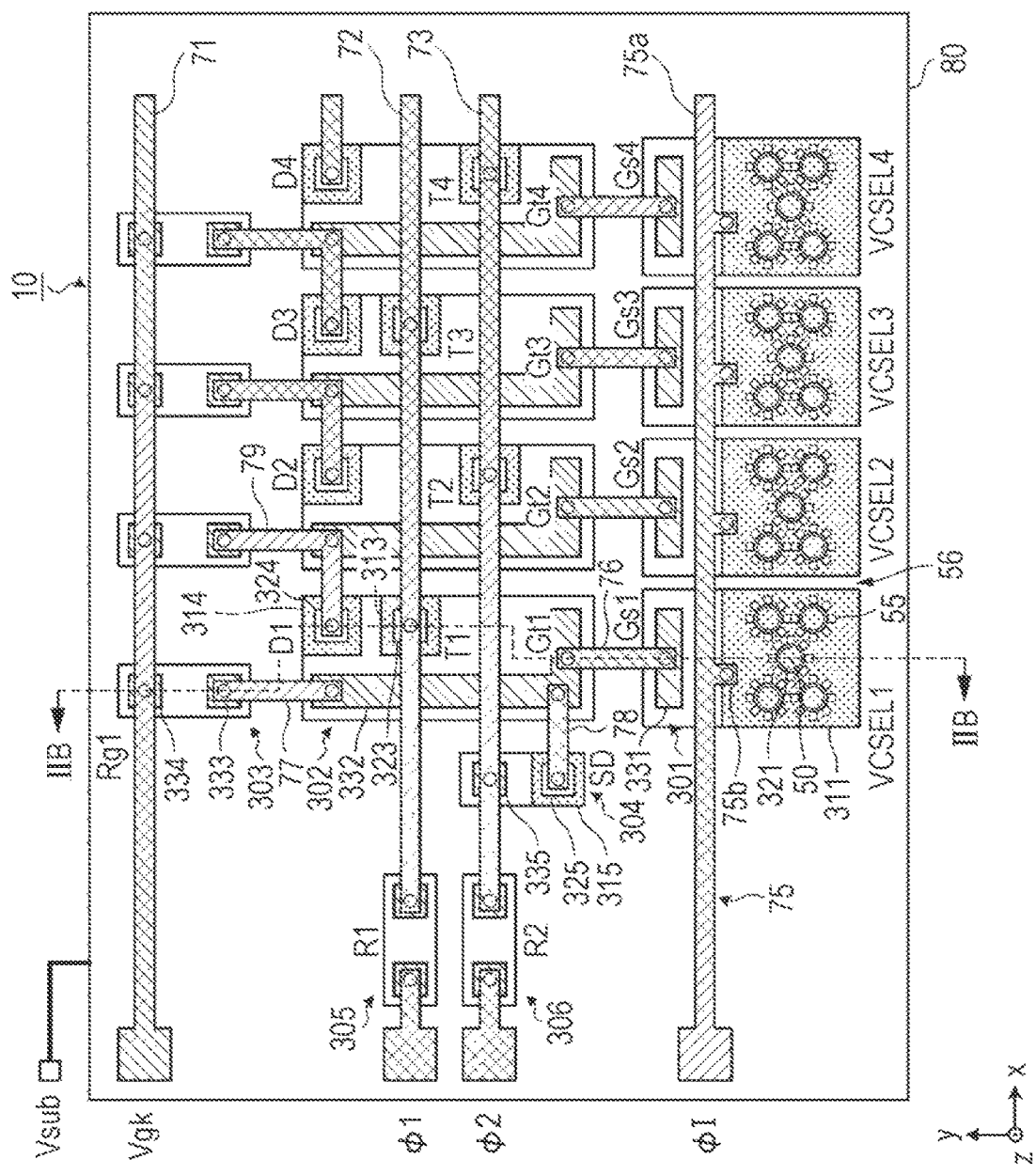
FIG. 2A is a plan view illustrating an example of the layout of the light-emitting component of the exemplary embodiment.
Figure 3:
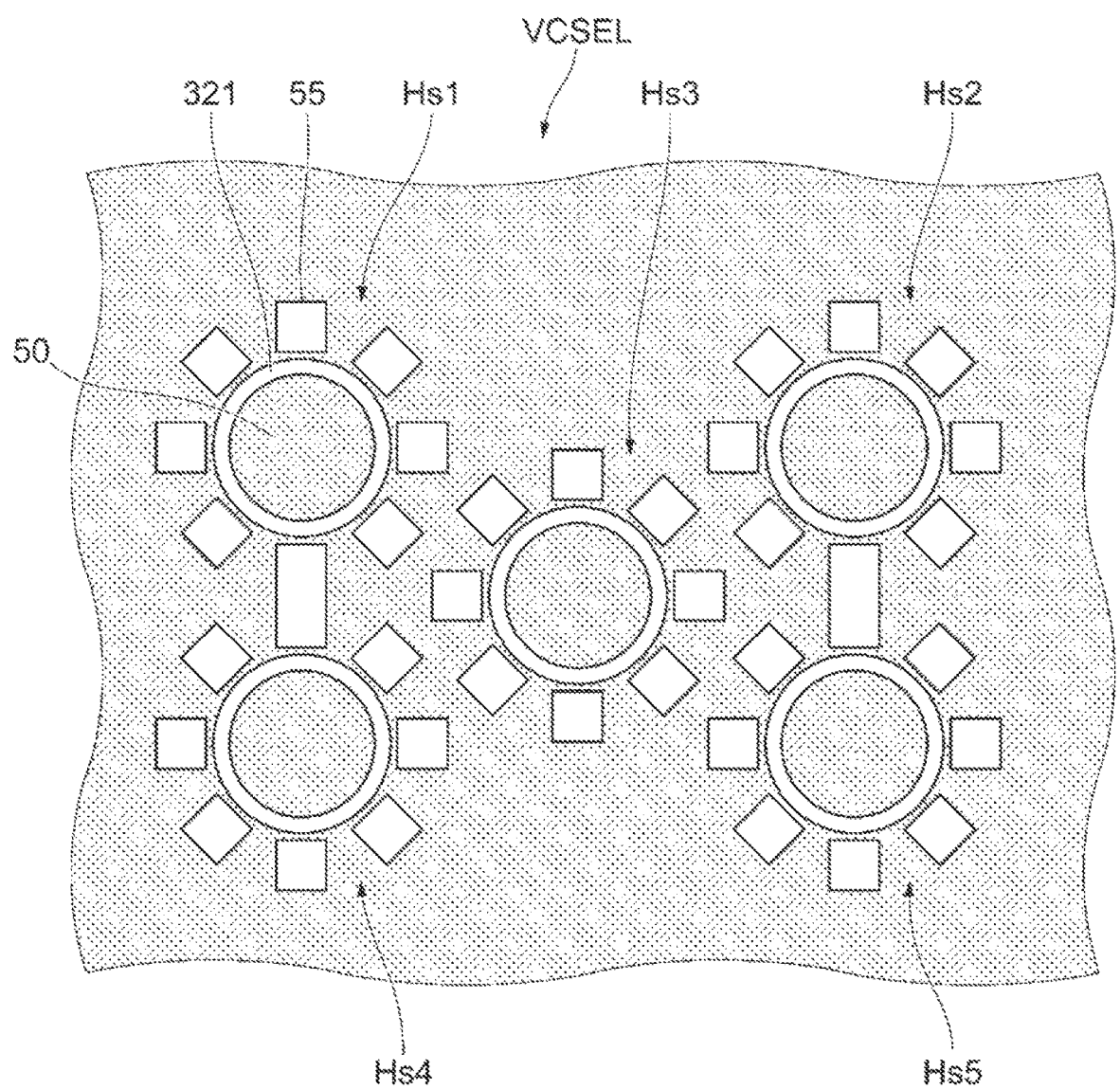
FIG. 3 is an enlarged view of a vertical cavity surface emitting laser (VCSEL) of the light-emitting component of the exemplary embodiment.

FIG. 2A is a plan view illustrating an example of the layout of the light-emitting component 10 of the exemplary embodiment. FIG. 2B is a sectional view taken along line IIB-IIB in FIG. 2A. FIG. 3 is an enlarged view of a VCSEL of the light-emitting component 10 of the exemplary embodiment.

Hereinafter, for the sake of description, the upper side of a drawing may also be referred to as the upper side, while the lower side of a drawing may also be referred to as the lower side. In the actual arrangement, however, the orientations of elements of the light-emitting component 10 are not necessarily the same as those in the drawings.

In FIG. 2A, in the plane of the drawing, the rightward direction is the x direction, the upward direction is the y direction, and the depth direction is the z direction. The light-emitting component 10 in FIG. 2A is thus viewed in the z direction. In FIG. 2B, in the plane of the drawing, the leftward direction is the z direction, and the upward direction is the y direction.

In FIG. 2A, the VCSEL1 through VCSEL4, transfer thyristors T1 through T4, and lines around these elements are shown. The Vsub terminal (back-surface electrode 89) provided on the back surface of the substrate 80 is shown outside the substrate 80.

From the bottom side of FIG. 2B, which is taken along line IIB-IIB in FIG. 2A, the VCSEL1, transfer thyristor T1, coupling diode D1, and power supply line resistor Rg1 are shown. In FIGS. 2A and 2B, the principal elements and terminals are designated by symbols. On the front surface of the substrate 80, the VCSELs (VCSEL1 through VCSEL4) are arranged in the x direction.

As shown in FIGS. 2A and 3, in the exemplary embodiment, a VCSEL is constituted by plural light-emitting elements Hs. Each of the light-emitting elements Hs has a function as a VCSEL and emits light through a light-emitting window 50. For the sake of a simple description, five light-emitting elements Hs1 through Hs5 are shown in FIGS. 2A and 3. In an actual VCSEL, however, forty light-emitting elements, for example, are provided.

The cross-sectional structure of the light-emitting component 10 will first be discussed below with reference to FIG. 2B.

On a p-type substrate 80, a p-type distributed Bragg reflector (DBR) anode layer (p-DBR layer) 81, an n-type gate layer (n-gate layer) 82, a light-emitting layer 83, a p-type gate layer (p-gate layer) 84, and an n-type DBR cathode layer (n-DBR layer) 85, which form the VCSEL1, transfer thyristor T1, coupling diode D1, and power supply line resistor Rg1, are sequentially disposed. Semiconductor layers constituted by the p-DBR layer 81, n-gate layer 82, light-emitting layer 83, p-gate layer 84, and n-DBR layer 85 stacked on each other will be called a semiconductor multilayer body.

As shown in FIG. 2B, a protective layer 90 made of an insulating material transparent to light is disposed on the light-emitting component 10. The protective layer 90 is disposed to cover the front surfaces and side surfaces of multilayer structures which are divided from the semiconductor multilayer body. The emitting direction of light from the VCSEL is indicated by the arrow in FIG. 2B. The light emitting direction is the direction (z direction in FIG. 2B) perpendicular to the surfaces of the substrate 80 (front and back surfaces of the light-emitting component 10).

The multilayer structures are connected with lines, such as the power supply line 71, first and second transfer signal lines 72 and 73, and ON signal line 75, via through-holes (indicated by the circles in FIG. 2A) formed in the protective layer 90. An explanation of the protective layer 90 and through-holes will be omitted.

As shown in FIG. 2B, the back-surface electrode 89, which serves as the Vsub terminal, is disposed on the back surface of the substrate 80.

The p-DBR layer 81, n-gate layer 82, light-emitting layer 83, p-gate layer 84, and n-DBR layer 85 are individual semiconductor layers and are monolithically deposited by epitaxial growth. The semiconductor multilayer body positioned between multilayer structures to be formed is removed by etching (mesa etching) so as to form multiple multilayer structures (islands) 301, 302, 303, . . . , electrically separated from each other. Instead of etching, ion implantation may be used to electrically separate the multiple multilayer structures from each other.

The p-DBR layer 81 and the n-DBR layer 85 are named in accordance with the functions as a VCSEL. That is, the p-DBR layer 81 functions as the anode of a VCSEL and also functions as a DBR layer, while the n-DBR layer 85 functions as the cathode of the VCSEL and also functions as a DBR layer. That is, the VCSEL has a thyristor structure having an anode and a cathode. It can also be said that the VCSEL has a structure constituted by a thyristor and the light-emitting layer 83, which is sandwiched between the layers forming the thyristor so as to emit light.

When the p-DBR layer 81 and the n-DBR layer 85 form the coupling diode D and the power supply line resistor Rg, they have different functions, which will be discussed later.

Not all the multilayer structures have the entirety of each of the above-described p-DBR layer 81, n-gate layer 82, light-emitting layer 83, p-gate layer 84, and n-DBR layer 85. For example, the multilayer structure 301 does not have part of each of the p-DBR layer 81, n-gate layer 82, light-emitting layer 83, p-gate layer 84, and n-DBR layer 85, as shown in FIG. 2B. This will be discussed in detail later.

The planar layout of the light-emitting component 10 will be described below with reference to the plan view of FIG. 2A.

The multilayer structure 301 includes the VCSEL1. The multilayer structure 302 includes the transfer thyristor T1 and the coupling diode D1. The multilayer structure 303 includes the power supply line resistor Rg1. A multilayer structure 304 includes the start diode SD. A multilayer structure 305 includes the current limiting resistor R1. A multilayer structure 306 includes the current limiting resistor R2.

In the light-emitting component 10, plural multilayer structures similar to the multilayer structures 301, 302, and 303 are formed in parallel with each other. Such plural multilayer structures include the VCSEL2, VCSEL3, VCSEL4, . . . , the transfer thyristors T2, T3, T4, . . . , and the coupling diodes D2, D3, D4, . . . , and so on, as in the multilayer structures 301, 302, and 303.

The multilayer structures 301 through 306 will be discussed below in detail with reference to FIGS. 2A and 2B.

As shown in FIG. 2B, the VCSEL1 formed in the multilayer structure 301 is constituted by the p-DBR layer 81, n-gate layer 82, light-emitting layer 83, p-gate layer 84, and n-DBR layer 85.

The p-DBR layer 81 forming the VCSEL1 includes a current confinement layer (current confinement layer 81b in FIGS. 4B and 4C) in which a current flowing through the light-emitting layer 83 is confined, as indicated by the black portions in FIG. 2B. The current confinement layer serves to concentrate a current flowing through the VCSEL on the central portion of the VCSEL. The peripheral portion of the VCSEL suffers from many defects due to mesa etching and are thus likely to cause the occurrence of non-radiative recombination. Hence, the current confinement layer is provided so that the central portion of the VCSEL serves as a current passing portion (region) α which makes it easy for a current to flow, while the peripheral portion serves as a current blocking portion (region) β which makes it difficult for a current to flow. The current blocking portion β may be called a current confinement region.

The current blocking portion β reduces power which would be consumed for non-radiative recombination, thereby enhancing power saving and light extraction efficiency. The light extraction efficiency is represented by the amount of light that can be extracted per unit power.

The current confinement layer will be discussed later.

To reduce a loss of light when passing through the VCSEL, light-emitting windows 50 are formed in the VCSEL to allow light to output from the light-emitting elements Hs' through Hs5 of the VCSEL. The light-emitting window 50 can be regarded as a portion where the amount of output light is maximized on the light-emitting surface of the VCSEL.

Multiple holes 55 (eight in the exemplary embodiment) are formed around each of the light-emitting elements Hs' through Hs5 of the VCSEL. The eight holes 55 are provided to surround the light-emitting window 50. As in the semiconductor multilayer body between the multilayer structures, the holes 55 are formed by removing the semiconductor multilayer body constituted by the p-DBR layer 81, n-gate layer 82, light-emitting layer 83, p-gate layer 84, and n-DBR layer 85. The current confinement layer 81b is oxidized from the edge portions of the multilayer structure 301 and via the holes 55 so as to form the current blocking portion β. This will be discussed in detail later. The edge portions of the multilayer structure 301 are portions at the edges of the multilayer structure 301 formed by removing the semiconductor multilayer body. That is, the edge portions of the multilayer structure 301 correspond to the side surfaces of the multilayer structure 301 on which the semiconductor multilayer body is exposed.

An n-type ohmic electrode (n-ohmic electrode) 321 provided on the n-DBR layer 85 (region 311) is used as the cathode electrode. The n-ohmic electrode 321 is provided between the light-emitting window 50 and the holes 55 so as to surround the light-emitting window 50. A p-type ohmic electrode (p-ohmic electrode) 331 provided on the p-gate layer 84 which is exposed by removing the n-DBR layer 85 is used as the gate Gs1. The p-ohmic electrode 331 is an example of a gate electrode that is electrically connected to each of the plural light-emitting elements to control ON/OFF of the light-emitting elements together. This will be discussed later in detail.

The p-gate layer 84 is continuously provided without separating the plural light-emitting elements Hs of the same VCSEL from each other. However, gaps 56 (see FIG. 2A) are provided to divide the p-gate layer 84 between a group of light-emitting elements Hs of one VCSEL and those of another VCSEL. For example, a gap 56 is formed to divide the p-gate layer 84 to separate the light-emitting elements Hs of the VCSEL1 from those in the VCSEL2.

The transfer thyristor T1 is constituted by the p-DBR layer 81, n-gate layer 82, light-emitting layer 83, p-gate layer 84, and n-DBR layer 85 stacked on each other. An n-ohmic electrode 323 provided on the n-DBR layer 85 (region 313) is used as the cathode terminal. A p-ohmic electrode 332 provided on the p-gate layer 84 which is exposed by removing the n-DBR layer 85 is used as the terminal of the gate Gt1 (may be called the gate terminal Gt1).

The coupling diode D1 disposed in the multilayer structure 302 is constituted by the p-gate layer 84 and the n-DBR layer 85. An n-ohmic electrode 324 disposed on the n-DBR layer 85 (region 314) is used as the cathode terminal. The p-ohmic electrode 332 disposed on the p-gate layer 84 which is exposed by removing the n-DBR layer 85 is used as the anode terminal. The anode terminal of the coupling diode D1 is the same as the gate Gt1 (gate terminal Gt1).

The power supply line resistor Rg1 provided in the multilayer structure 303 is constituted by the p-gate layer 84. That is, the p-gate layer 84 between p-ohmic electrodes 333 and 334 disposed on the p-gate layer 84 exposed by removing the n-DBR layer 85 is used as the power supply line resistor Rg1.

The start diode SD provided in the multilayer structure 304 is constituted by the p-gate layer 84 and the n-DBR layer 85. That is, an n-ohmic electrode 325 disposed on the n-DBR layer 85 (region 315) is used as the cathode terminal. A p-ohmic electrode 335 disposed on the p-gate layer 84 exposed by removing the n-DBR layer 85 is used as the anode terminal.

The current limiting resistor R1 in the multilayer structure 305 and the current limiting resistor R2 in the multilayer structure 306 are provided in a manner similar to the power supply line resistor Rg1 in the multilayer structure 303. The p-gate layer 84 between two p-ohmic electrodes are used as the current limiting resistor R1, while the p-gate layer 84 between two p-ohmic electrodes are used as the current limiting resistor R2.

The connection relationship between the individual elements will be discussed below with reference to FIG. 2A.

The ON signal line 75 includes a trunk portion 75a and plural branch portions 75b. The trunk portion 75a is provided to extend in the row direction of the VCSELs. The branch portions 75b each branch off from the trunk portion 75a, and one branch portion 75b is connected to the corresponding n-ohmic electrode 321, which also serves as the cathode terminal of the VCSEL1 provided in the multilayer structure 301. The other branch portions 75b are also connected to the corresponding n-ohmic electrodes 321, which are the cathode terminals of the other VCSELs.

The ON signal line 75 is connected to the φI terminal disposed close to the VCSEL1.

The first transfer signal line 72 is connected to the n-ohmic electrode 323, which serves as the cathode terminal of the transfer thyristor T1 provided in the multilayer structure 302. The first transfer signal line 72 is also connected to the cathode terminals of the other odd-numbered transfer thyristors T provided in the corresponding multilayer structures similar to the multilayer structure 302. The first transfer signal line 72 is connected to the φ1 terminal via the current limiting resistor R1 provided in the multilayer structure 305.

The second transfer signal line 73 is connected to n-ohmic electrodes, which serve as the cathode terminals of the even-numbered transfer thyristors T provided in corresponding multilayer structures. The second transfer signal line 73 is connected to the φ2 terminal via the current limiting resistor R2 provided in the multilayer structure 306.

The power supply line 71 is connected to the p-ohmic electrode 334, which is one terminal of the power supply line resistor Rg1, provided in the multilayer structure 303. The power supply line 71 is also connected to one terminal of each of the other power supply line resistors Rg. The power supply line 71 is connected to the Vgk terminal.

The p-ohmic electrode 331 (gate terminal Gs1) provided in the multilayer structure 301 is connected via a connecting line 76 to the p-ohmic electrode 332 (gate terminal Gt1) of the transfer thyristor T1 provided in the multilayer structure 302.

The p-ohmic electrode 332 (gate terminal Gt1) is connected via a connecting line 77 to the p-ohmic electrode 333, which is the other terminal of the power supply line resistor Rg1, provided in the multilayer structure 303.

The n-ohmic electrode 324 (cathode terminal of the coupling diode D1) provided in the multilayer structure 302 is connected via a connecting line 79 to a p-type ohmic electrode, which is the gate terminal Gt2 of the adjacent transfer thyristor T2.

Regarding the other VCSELs, the other transfer thyristors T, and the other coupling diodes D, the connection relationship between the elements is similar to that described above, though an explanation thereof is omitted.

The p-ohmic electrode 332 (gate terminal Gt1) in the multilayer structure 302 is connected via a connecting line 78 to the n-ohmic electrode 325 (cathode terminal of the start diode SD) in the multilayer structure 304. The p-ohmic electrode 335 (anode terminal of the start diode SD) is connected to the second transfer signal line 73.

The above-described connection mode and configuration of the light-emitting component 10 are applicable when a p-type substrate is used as the substrate 80. If an n-type substrate is used as the substrate 80, the above-described polarities are reversed. If an i-type substrate is used as the substrate 80, a terminal to be connected to the power supply line 200a for supplying the reference potential Vsub is provided on the side of the substrate 80 on which the drive portion 101 and the light-emitting portion 102 are formed. The connection mode and configuration of the light-emitting component 10 when an i-type substrate is used are those when a p-type substrate is used or those when an n-type substrate is used.

A manufacturing method for the light-emitting component 10 will be described below with reference to FIG. 2B.

On the p-type substrate 80, the p-DBR layer 81, n-gate layer 82, light-emitting layer 83, p-gate layer 84, and n-DBR layer 85 are sequentially deposited by epitaxial growth, thereby forming a semiconductor multilayer body. The manufacturing method will be discussed, assuming that the substrate 80 is a p-type GaAs substrate. However, an n-type GaAs substrate or an i-type GaAs substrate without impurities may be used.

The DBR layers are each formed of a low-refractive-index layer having a composition of a high Al content, such as $Al_{0.9}Ga_{0.1}As$, and a high-refractive-index layer having a composition of a low Al content, such as $Al_{0.2}Ga_{0.8}As$. The film thickness (optical path length) of each of the low-refractive-index layer and the high-refractive-index layer are set to be 0.25 (one fourth) of the central wavelength, for example. The Al content ratio in the composition of the low-refractive-index layer and that of the high-refractive-index layer may be changed in a range of 0 to 1.

The p-DBR layer 81 is constituted by a lower p-DBR layer 81a, the current confinement layer 81b, and an upper p-DBR layer 81c (see FIGS. 4B and 4C) sequentially stacked on each other. The impurity concentration of the lower p-DBR layer 81a and the upper p-DBR layer 81c is $1 \times 10^{18}/cm^3$, for example. The current confinement layer 81b is made of AlAs or p-type AlGaAs having a high impurity concentration of Al. The current confinement layer 81b may be made of another compound as long as it can confine a current path due to the high electrical resistance as a result of $Al_2O_3$ being formed through the oxidation of Al.

The impurity concentration of the n-DBR layer 85 is $1 \times 10^{18}/cm^3$, for example.

The n-gate layer 82 is made of n-type $Al_{0.9}GaAs$ having an impurity concentration of $1 \times 10^{17}/cm^3$, for example. The Al content may be changed from 0 to 1.

The light-emitting layer 83 has a quantum well structure in which well layers and barrier layers are alternately disposed on each other. The well layers are made of GaAs, AlGaAs, InGaAs, GaAsP, AlGaInP, GaInAsP, or GaInP, for example. The barrier layers are made of AlGaAs, GaAs, GaInP, or GaInAsP, for example. The light-emitting layer 83 may be formed as quantum wires or quantum dots.

The p-gate layer 84 is made of p-type $Al_{0.9}GaAs$ having an impurity concentration of $1 \times 10^{17}/cm^3$, for example. The Al content may be changed from 0 to 1.

These semiconductor layers are deposited by metal organic chemical vapor deposition (MOCVD) or molecular beam epitaxy (MBE), for example, thereby forming a semiconductor multilayer body.

Then, n-ohmic electrodes, such as the n-ohmic electrodes 321, 323, and 324, are formed on the n-DBR layer 85. The n-ohmic electrodes are made of Au with a content of Ge (AuGe), which easily achieves ohmic contact with an n-type semiconductor layer, such as the n-DBR layer 85. The n-ohmic electrodes are formed by the lift-off process, for example.

Then, the n-DBR layer 85, p-gate layer 84, light-emitting layer 83, n-gate layer 82, and p-DBR layer 81 are sequentially subjected to etching, so that the semiconductor multilayer body is divided into plural multilayer structures, such as the multilayer structures 301 and 302. At the same time, the holes 55 are formed in the multilayer structure 301. To perform the above-described etching, wet etching using a sulfuric-acid etchant (the weight ratio of the etchant between sulfuric acid:hydrogen peroxide solution:water is 1:10:300) may be used, or anisotropic dry etching (reactive-ion etching (RIE)) using boron trichloride may be used. Etching to divide the semiconductor multilayer body into multilayer structures may also be called mesa etching or post etching.

Then, the current confinement layer 81b is oxidized from the edge portions of the multilayer structures and via the holes 55, that is, from the exposed side surfaces of the current confinement layer 81b, thereby forming the current blocking portion β. To oxidize the current confinement layer 81b, Al in AlAs or AlGaAs forming the current confinement layer 81b is oxidized by water vapor oxidation under a temperature of 300 to 400° C. Oxidation progresses from the exposed side surfaces of the current confinement layer 81b, thereby forming the current blocking portion β made of $Al_2O_3$. The portion of the current confinement layer 81b which is not oxidized serves as the current passing portion α.

Then, the n-DBR layer 85 is subjected to etching so that the p-gate layer 84 is exposed. To perform this etching, wet etching using a sulfuric-acid etchant (the weight ratio of the etchant between sulfuric acid:hydrogen peroxide solution: water is 1:10:300) may be used, or anisotropic dry etching using boron trichloride may be used. As a result of this etching, p-ohmic electrodes, such as the p-ohmic electrodes 331 and 332, are formed on the p-gate layer 84. The p-ohmic electrodes are made of Au with a content of Zn (AuZn), which easily achieves ohmic contact with a p-type semiconductor layer, such as the p-gate layer 84. The p-ohmic electrodes are formed by the lift-off process, for example.

Then, by using an insulating material, such as $SiO_2$, SiON, or SiN, the protective layer 90 is formed to cover the surfaces of the multilayer structures, such as the multilayer structures 301 and 302. Then, through-holes are formed in the protective layer 90 on the n-ohmic electrodes, such as n-ohmic electrodes 321, 323, and 324, and the p-ohmic electrodes, such as p-ohmic electrodes 331 and 332. Lines, such as the power supply line 71, first and second transfer signal lines 72 and 73, and ON signal line 75, connecting to the n-ohmic electrodes and the p-ohmic electrodes via the through-holes formed in the protective layer 90 are formed, and the back-surface electrode 89 is formed. The lines and the back-surface electrode 89 are made of Al or Au.

The light-emitting component 10 is manufactured as described above.

As the substrate 80, InP, GaN, InAs, other III-V compounds, and II-VI compounds, sapphire, Si, and Ge may be used. If a substrate made of a compound different from GaAs is used, materials having a lattice constant and other properties of the crystal lattice, such as the distortion structure, distortion relaxing layer, and metamorphic growth, which substantially match those of the substrate are used as materials forming the semiconductor multilayer body monolithically stacked on the substrate. As an example, InAs, InAsSb, and GaInAsSb may be used on an InAs substrate; InP and InGaAsP may be used on an InP substrate; GaN, AlGaN, and InGaN may be used on a GaN or sapphire substrate; and Si, SiGe, and GaP may be used on a Si substrate. If the semiconductor layers subjected to crystal growth are bonded to another support substrate, it is not necessary that the lattice constant of materials forming the semiconductor layers substantially match that of the support substrate.

(Multilayer Structure of Light-Emitting Elements Hs of VCSEL)

Figure 4A:
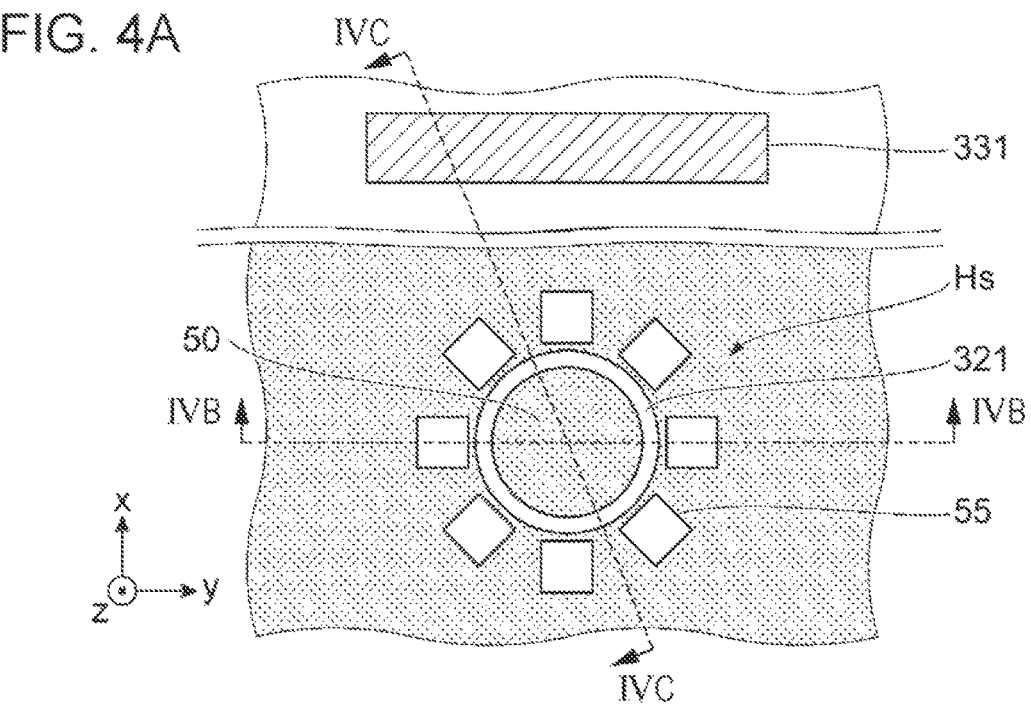
FIGS. 4A through 4C are enlarged views of a light-emitting element in the light-emitting component of the exemplary embodiment.
Figure 4B:
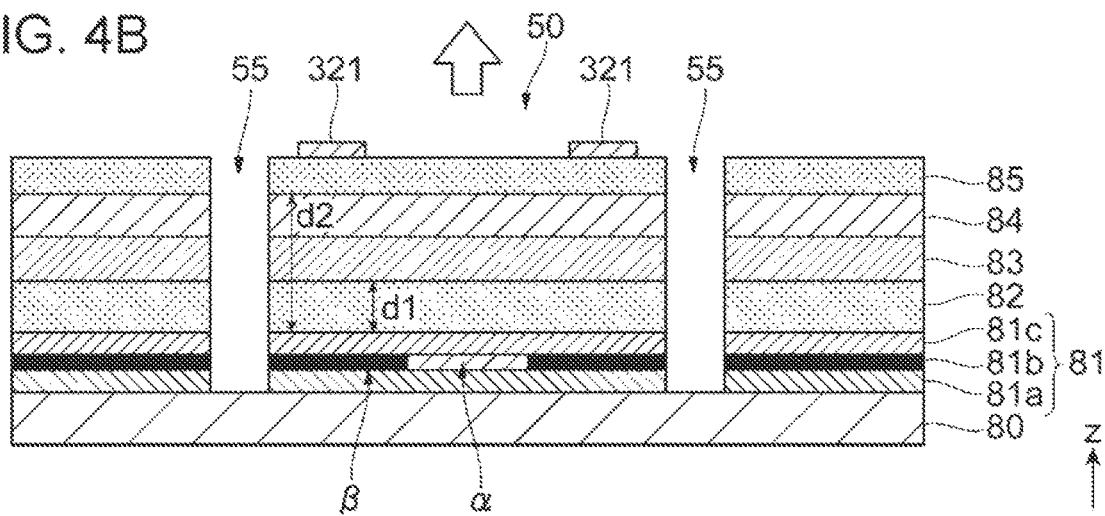
Figure 4C:
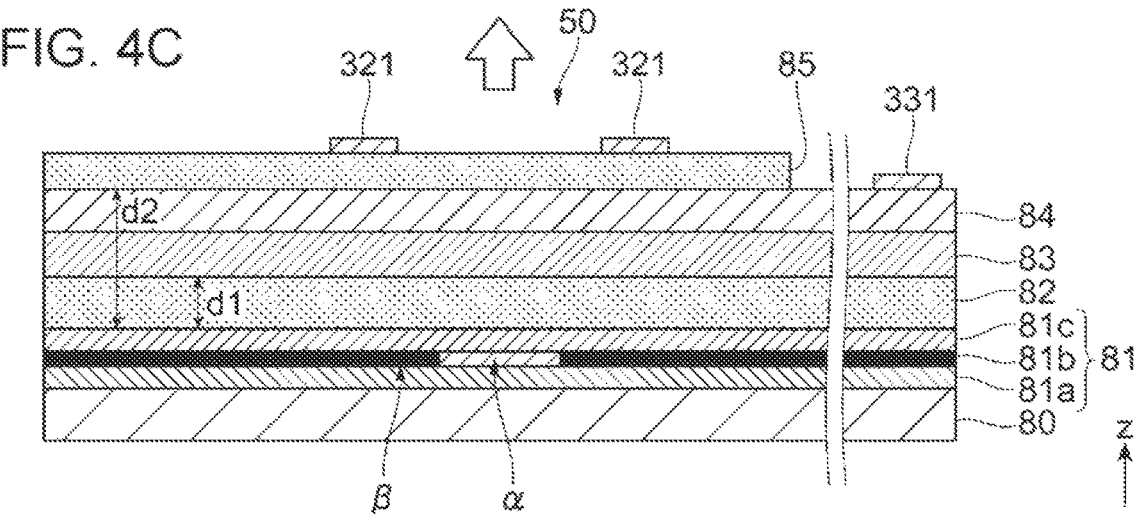

FIGS. 4A through 4C are enlarged views of a light-emitting element Hs in the light-emitting component 10 of the exemplary embodiment. FIG. 4A is a plan view of the light-emitting element Hs. FIG. 4B is a sectional view taken along line IVB-IVB in FIG. 4A. FIG. 4C is a sectional view taken along line IVC-IVC in FIG. 4A.

As shown in FIG. 4A, the eight holes 55 are formed around the light-emitting element Hs. These holes 55 are also called trenches, and a VCSEL having this structure is called a trench VCSEL. As shown in FIG. 4B, the holes 55 are disposed to reach the substrate 80 as a result of removing the n-DBR layer 85, p-gate layer 84, light-emitting layer 83, n-gate layer 82, and p-DBR layer 81 by etching. The current confinement layer 81b forming the p-DBR layer 81 is oxidized via the holes 55 and then continues to oxidize around the holes 55. That is, the central portion surrounded by the eight holes 55 serves as a portion which is not oxidized (current passing portion α).

As shown in FIGS. 4B and 4C, the current confinement layer 81b is oxidized from the side surfaces of the multilayer structure 301 and via the holes 55, thereby forming the current blocking portion β in the current confinement layer 81b, except for the current passing portion α of the light-emitting window 50.

The multiple holes 55 are circularly disposed to surround the light-emitting window 50, so that the planar shape of the portion which is not oxidized (current passing portion α) becomes close to a circle. In the VCSEL, as the light-emitting window 50 is closer to a circle and the diameter of the circle is smaller, the VCSEL is more likely to oscillate in a single mode. The resulting strength distribution is thus more likely to be unimodal. To achieve this, it is appropriate that the multiple holes 55 be circularly disposed to make the current passing portion α closer to a circle. In this case, the current confinement layer 81b is also circularly disposed around the holes 55. It can also be said that, to circularly form the current confinement layer 81b, the holes 55 are disposed at predetermined spacings around the light-emitting window 50 through which the light-emitting element Hs emits light.

The n-DBR layer 85, p-gate layer 84, light-emitting layer 83, n-gate layer 82, and p-DBR layer 81 of the light-emitting element Hs, except for the holes 55, serve as setting thyristors S for setting (controlling) the ON/OFF states of the VCSELs. The n-DBR layer 85, p-gate layer 84, light-emitting layer 83, n-gate layer 82, and upper p-DBR layer 81c located above the current confinement layer 81b serve as a current path. Accordingly, as the light-emitting element Hs other than the holes 55 is larger, the resistance to a current flowing through the VCSEL becomes lower. The number of holes 55 is thus determined in accordance with the shape of the portion which is not oxidized (current passing portion α) and the resistance in the path of the VCSEL through which a current flows. At least four holes 55 are required. Although the planar shape of the holes 55 is a square in FIG. 4A, it may be formed in another shape, such as a circle or a rectangle.

It is desirable that the holes 55 be deep enough to reach the position at least until the bottom surface of the p-ohmic electrode 331, which serves as a gate electrode. That is, the holes 55 may at least pass through the n-DBR layer 85 and reach the top surface of the p-gate layer 84. This makes it easy to separate the light-emitting points of the plural light-emitting elements Hs from each other.

It is more desirable that the holes 55 be deep enough to reach the bottommost layer of the light-emitting element Hs having a thyristor structure. That is, the holes 55 may be deep enough to reach the position of the p-DBR layer 81. In FIG. 4B, the holes 55 even pass through the p-DBR layer 81 and reach the substrate 80. Alternatively, the holes 55 may stop at the position of the top surface of the p-DBR layer 81 without passing therethrough. This can reduce the etching time. Nevertheless, allowing the holes 55 to pass through the p-DBR layer 81 makes it easier to separate the light-emitting points of the plural light-emitting elements Hs from each other.

As shown in FIG. 4C, the p-gate layer 84 forming part of the light-emitting elements Hs having a thyristor structure is continuously provided to connect the plural light-emitting elements Hs of the same VCSEL via the multiple holes 55. The p-gate layer 84 is also electrically connected to the p-ohmic electrode 331, which is a gate electrode. That is, although the p-gate layer 84 is partly divided by the holes 55 as shown in FIG. 4B, it is continuously provided in the area where the holes 55 do not intervene and is not electrically separated, as shown in FIG. 4C. The p-gate layer 84, which is the upper gate layer of the thyristor, is continuously provided for the plural light-emitting elements Hs of the same VCSEL and serves as the common gate layer for the plural light-emitting elements Hs. Between the two gate layers of the thyristor, the upper gate layer is a gate layer located above the other gate layer, while the lower gate layer is a gate layer located below the other gate layer.

The film thickness d1 of the n-gate layer 82 is greater than the wavelength of light emitted from the light-emitting elements Hs. This improves the electrical characteristics of the light-emitting elements Hs and makes it easy to operate the plural light-emitting elements Hs to be ON/OFF in synchronization with each other.

The film thickness d2 of the length from the top surface of the p-gate layer 84, which is the upper gate layer of the thyristor, to the bottom surface of the n-gate layer 82, which is the lower gate layer of the thyristor, is set to be an integral multiple (a multiple of two or greater) of the wavelength of light emitted from the light-emitting elements Hs. This facilitates the laser oscillation of the VCSEL.

Hitherto, the film thickness d2 is typically set to be the same length as the wavelength of light emitted from light-emitting elements Hs. However, setting of the film thicknesses d1 and d2 as described above based on the wavelength of light emitted from light-emitting elements Hs makes it easier to operate the plural light-emitting elements Hs to be ON/OFF in synchronization with each other and also facilitates the laser oscillation of the VCSEL.

The film thickness of the p-gate layer 84 may be set to be greater than the wavelength of light emitted from the light-emitting elements Hs. That is, the film thickness of at least one of the n-gate layer 82 and the p-gate layer 84 is set to be greater than the wavelength of light. It is necessary, however, that the layer having a thickness greater than the wavelength of light be without a current confinement layer.

The n-DBR layer 85, which is the uppermost layer of the thyristor structure, is continuously provided to connect the plural light-emitting elements Hs of the same VCSEL via the multiple holes 55. That is, although the n-DBR layer 85 is partly divided by the holes 55 as shown in FIG. 4B, it is continuously provided in the area where the holes 55 do not intervene and is not electrically separated, as shown in FIG. 4C.

This configuration improves the switching efficiency achieved by the p-ohmic electrode 331. As a result, although plural light-emitting elements Hs are provided, they can be switched ON/OFF substantially at the same time. In other words, the plural light-emitting elements Hs can be turned ON/OFF almost simultaneously.

The configuration of the p-ohmic electrode 331 in the exemplary embodiment is applicable, not only to a trench VCSEL, but also to a mesa VCSEL.

Figure 5:
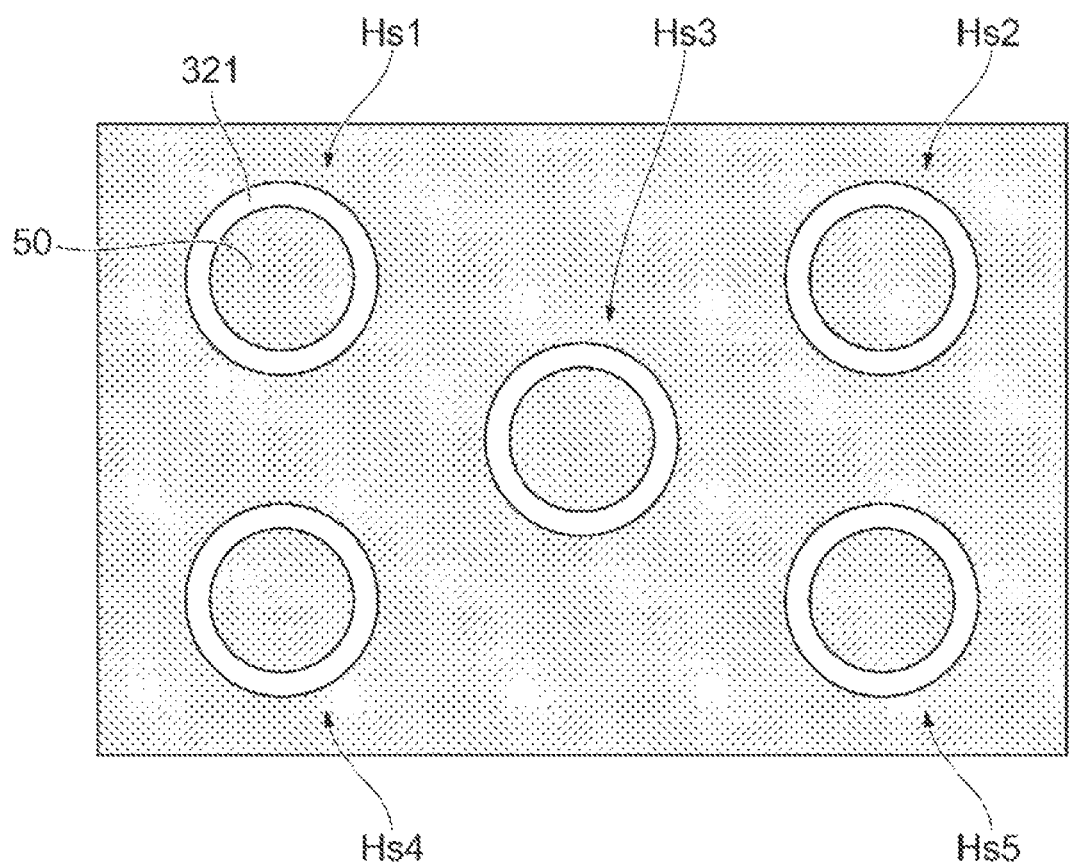
FIG. 5 is an enlarged view of a mesa VCSEL.

FIG. 5 is an enlarged view of a mesa VCSEL. The mesa VCSEL shown in FIG. 5 is constituted by multiple light-emitting elements Hs, as in the trench VCSEL shown in FIGS. 4A through 4C. In FIG. 5, five light-emitting elements Hs' through Hs5 are shown. Light-emitting windows 50 through which light from the light-emitting elements Hs' through Hs5 is output are formed in the VCSEL. Unlike the trench VCSEL shown in FIGS. 4A through 4C, holes 55 are not formed.

Figure 6A:
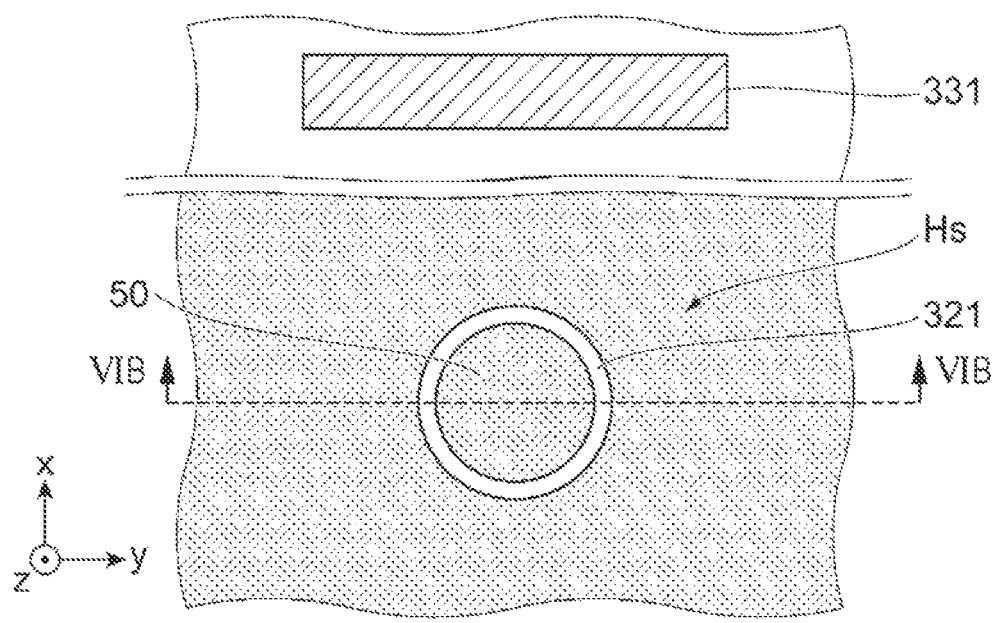
FIGS. 6A and 6B are enlarged views of a light-emitting element in a mesa VCSEL.
Figure 6B:
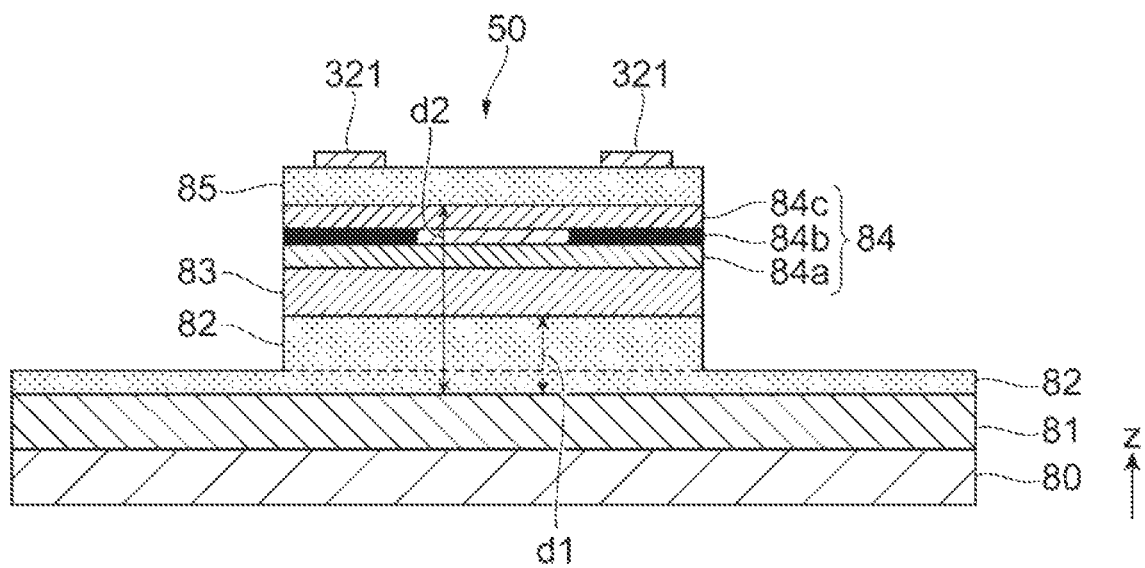

FIGS. 6A and 6B are enlarged views of a light-emitting element Hs in a mesa VCSEL. FIG. 6A is a plan view of the light-emitting element Hs. FIG. 6B is a sectional view taken along line VIB-VIB in FIG. 6A.

As shown in FIG. 6B, the light-emitting element Hs has a thyristor structure, as in the light-emitting element Hs shown in FIGS. 4A through 4C. A p-type DBR anode layer (p-DBR layer) 81, an n-type gate layer (n-gate layer) 82, a light-emitting layer 83, a p-type gate layer (p-gate layer) 84, and an n-type DBR cathode layer (n-DBR layer) 85 are sequentially disposed.

The p-gate layer 84 is constituted by a lower p-gate layer 84a, a current confinement layer 84b, and an upper p-gate layer 84c sequentially stacked on each other.

The p-DBR layer 81, n-gate layer 82, p-gate layer 84, and n-DBR layer 85 of the light-emitting element Hs function as a setting thyristor.

An n-type ohmic electrode (n-ohmic electrode) 321 provided on the n-DBR layer 85 is used as the cathode electrode. The n-ohmic electrode 321 is provided to surround the light-emitting window 50. An n-type ohmic electrode (n-ohmic electrode) 336 provided on the n-gate layer 82 which is exposed by removing the n-DBR layer 85, p-gate layer 84, light-emitting layer 83, and part of the upper portion of the n-gate layer 82, as shown in FIG. 6B, is used as the gate Gs1. The n-ohmic electrode 336 is an example of a gate electrode.

In the mesa light-emitting elements Hs, the p-gate layer 84, which is the upper p-type layer of the thyristor, and the n-DBR layer 85, which is the upper n-type layer of the thyristor, are divided between plural light-emitting elements Hs. In the mesa light-emitting elements Hs, part of the upper portion of the n-gate layer 82, which is the lower gate layer, is also divided between the plural light-emitting elements Hs. As a result, the n-gate layer 82 has an inverted T shape.

Part of the lower portion of the n-gate layer 82, which is continuously provided to connect light-emitting elements Hs, is used as a gate layer and is connected to the n-ohmic electrode 336, which is a gate electrode. The n-gate layer 82, which is the lower gate layer of the thyristor, is continuously provided for the plural light-emitting elements Hs of the same VCSEL and serves as the common gate layer for the plural light-emitting elements Hs. In one mode, the entirety of the n-gate layer 82 is continuously provided to connect the plural light-emitting elements Hs as a common gate layer. In another mode, part of the upper portion of the n-gate layer 82 is divided between the plural light-emitting elements Hs, in which case, the lower portion of the n-gate layer 82 is continuously provided to connect the plural light-emitting elements Hs, as shown in FIG. 6B.

As in the light-emitting element Hs shown in FIGS. 4B and 4C, the film thickness d1 of the n-gate layer 82 is greater than the wavelength of light emitted from the light-emitting elements Hs. This improves the electrical characteristics of the light-emitting elements Hs and makes it easy to operate the plural light-emitting elements Hs to be ON/OFF in synchronization with each other.

As in the light-emitting element Hs shown in FIGS. 4B and 4C, the film thickness d2 of the length from the top surface of the p-gate layer 84, which is the upper gate layer of the thyristor, to the bottom surface of the n-gate layer 82, which is the lower gate layer of the thyristor, is set to be an integral multiple (a multiple of two or greater) of the wavelength of light emitted from the light-emitting elements Hs. This facilitates the laser oscillation of the VCSEL.

In the mesa light-emitting elements Hs, as well as in the trench light-emitting elements Hs, setting of the film thicknesses d1 and d2 as described above based on the wavelength of light emitted from the light-emitting elements Hs makes it easier to operate the plural light-emitting elements Hs to be ON/OFF in synchronization with each other and also facilitates the laser oscillation of the VCSEL.

The current confinement layer 84b is provided as part of the p-gate layer 84, which is divided between plural light-emitting elements Hs. In the current confinement layer 84b, a current is confined in the protruding portion of the inverted T shape of the light-emitting element Hs.

In the mesa VCSEL, as discussed above, part of the upper portion of the n-gate layer 82, which is the lower gate layer, is divided between the plural light-emitting elements Hs. It can also be said that each divided portion serves as a current confinement layer where a current flowing through the light-emitting layer 83 is confined.

[Thyristor]

The basic operation of thyristors (VCSELs and transfer thyristors T) will be described below. The thyristor is a semiconductor element with three terminals, that is, an anode terminal (anode), a cathode terminal (cathode), and a gate terminal (gate), as discussed above. For example, the thyristor is constituted by p-type semiconductor layers (p-DBR layer 81 and p-gate layer 84) and n-type semiconductor layers (n-gate layer 82 and n-DBR layer 85) made of GaAs, GaAlAs, or AlAs, for example, stacked on the substrate 80. That is, the thyristor has a pnpn structure. The thyristor will be explained below, assuming that the forward potential (diffusion potential) Vd of a pn junction constituted by a p-type semiconductor layer and an n-type semiconductor layer is 1.5 V as an example.

In the following description, the reference potential Vsub supplied to the back-surface electrode 89 (see FIGS. 2A and 2B), which is the Vsub terminal, is a high level potential ("H"), which is 0 V, while the power supply potential Vgk supplied to the Vgk terminal is a low level potential ("L"), which is −5 V, for example. The high level potential may be indicated by "H" (0 V), while the low level potential may be indicated by "L" (−5 V).

The operation of a thyristor alone will first be discussed below. The anode of the thyristor is assumed to be at 0 V.

The thyristor in the OFF state in which a current does not flow between the anode and the cathode shifts to the ON state (is turned ON) when a potential lower than a threshold voltage (that is, a negative potential having a larger absolute value) is applied to the cathode. The threshold voltage of the thyristor is the value obtained by subtracting the forward potential Vd (1.5 V) of the pn junction from the gate potential.

When the thyristor is turned ON, the gate of the thyristor is made to have a potential close to the potential of the anode. Since the anode is at 0 V, the gate is also at 0 V. The cathode of the ON-state thyristor is made to be have a potential close to the potential obtained by subtracting the forward potential Vd (1.5 V) of the pn junction from the potential of the anode. Since the anode is at 0 V, the cathode of the ON-state thyristor is at a potential close to −1.5 V (that is, a negative potential having an absolute value greater than 1.5). The potential of the cathode is set in relation to the power source for supplying a current to the ON-state thyristor.

The ON-state thyristor shifts to the OFF state (is turned OFF) when the cathode is made to have a potential higher than the potential required for maintaining the ON state of the thyristor. More specifically, the ON-state thyristor is turned OFF when the cathode is made to have a negative potential having a smaller absolute value, 0 V, or a positive potential, which is higher than a potential close to −1.5 V.

In contrast, the thyristor remains in the ON state when a potential (negative potential having a larger absolute value) lower than the potential required for maintaining the ON state is continuously applied to the cathode of the ON-state thyristor and a current for maintaining the ON state is supplied to the cathode of the ON-state thyristor.

The above-described voltages are only examples and are subjected to change in accordance with the wavelength and the amount of light of the VCSEL. In this case, the potential ("L") of the ON signal $\phi$I is adjusted.

The thyristor is made of a semiconductor, such as GaAs, and may thus emit light between the n-gate layer 82 and the p-gate layer 84 when it is in the ON state. The amount of light emitted from the thyristor is determined by the area of the cathode and the current flowing between the cathode and the anode. If light emission of the thyristor is not utilized, the area of the cathode may be decreased or the material for the electrode or the material for the wiring may be adjusted to block light from the thyristor.

(Operation of Light-Emitting Component 10)

The operation of the light-emitting component 10 will be described below.

[Timing Chart]

Figure 7:
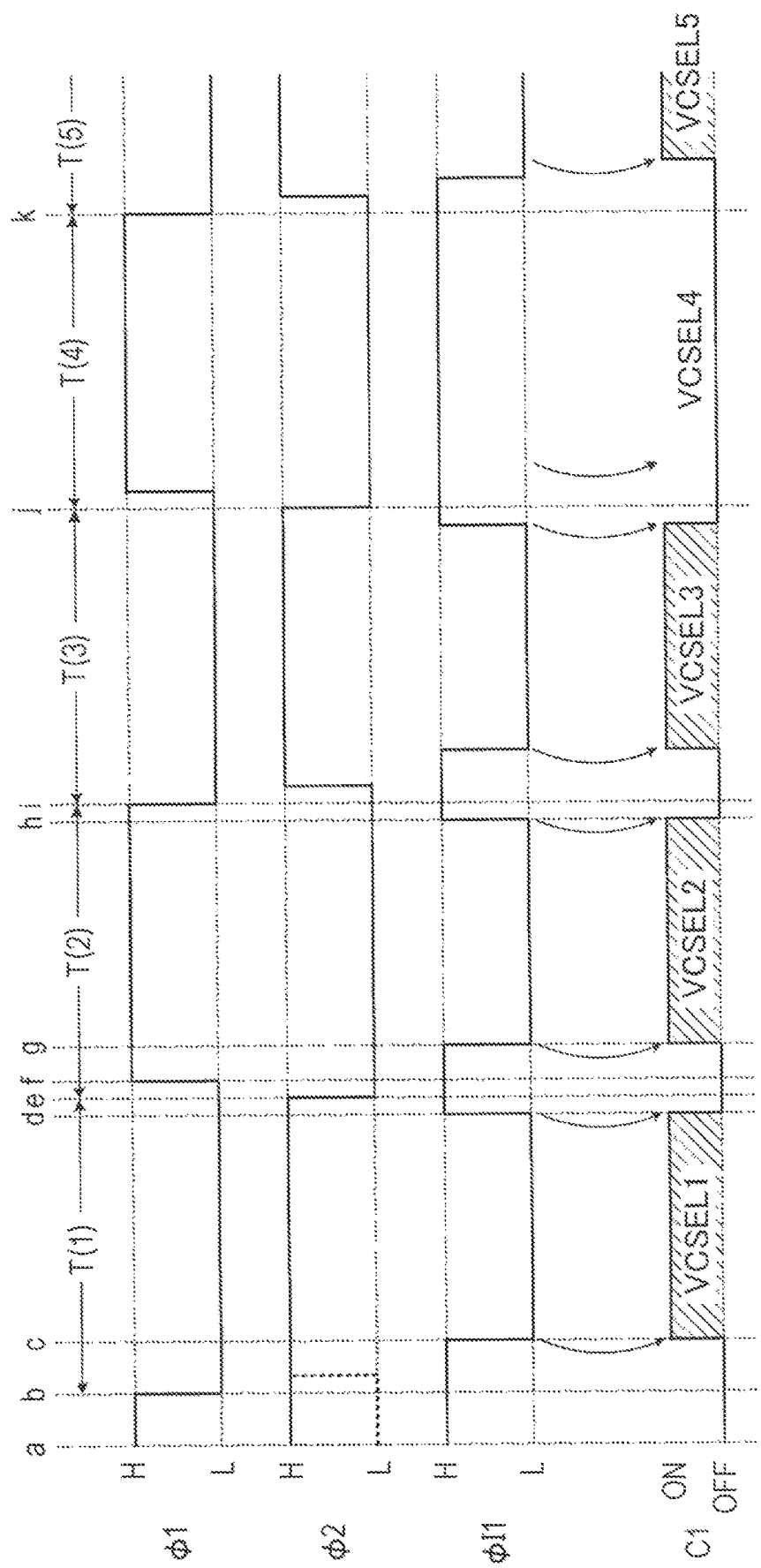
FIG. 7 is a timing chart for explaining the operation of the light-emitting component.

FIG. 7 is a timing chart for explaining the operation of the light-emitting component 10.

In FIG. 7, the timing chart for controlling ON (oscillation) and OFF of the five VCSELs (VCSEL1 through VCSEL5) of the light-emitting component 10 is shown. In FIG. 7, VCSEL1, VCSEL2, VCSEL3, and VCSEL5 are turned ON, while VCSEL4 is turned OFF.

In FIG. 7, the time elapses from time a to time k in alphabetical order. The ON/OFF state of VCSEL1 is controlled in the period T(1), that of VCSEL2 is controlled in the period T(2), that of VCSEL3 is controlled in the period T(3), and that of VCSEL4 is controlled in the period T(4). Likewise, the ON/OFF states of VCSEL5 through VCSEL128 are controlled in the period T(5) through period T(128), respectively.

The periods T(1), T(2), T(3), . . . have the same length of time. When it is not necessary to distinguish the periods T(1), T(2), T(3), . . . , from each other, they will simply be called the period T.

The first transfer signal $\phi$1 sent to the $\phi$1 terminal (see FIGS. 1 and 2A) and the second transfer signal $\phi$2 sent to the $\phi$2 terminal (see FIGS. 1 and 2A) each have two potentials, "H" (0 V) and "L" (−5 V). Regarding the waveform of each of the first and second transfer signals $\phi$1 and $\phi$2, the waveform in continuous two periods T (period T(1) and period T(2), for example) is set as a unit and is repeated.

Hereinafter, "H" (0 V) and "L" (−5 V) may simply be designated by "H" and "L", respectively.

The first transfer signal $\phi$1 shifts from "H" (0 V) to "L" (−5 V) at the start time b of the period T(1), then shifts back from "L" to "H" at time f, and again shifts from "H" to "L" at the end time i of the period T(2).

The second transfer signal $\phi$2 is at "H" (0 V) at the start time b of the period T(1), and then shifts to "L" at time e, and then shifts back to "H" between the end time i of the period T(2) and time j and remains at "H" until time j.

Upon comparing the first and second transfer signals $\phi$1 and $\phi$2 with each other, the second transfer signal $\phi$2 is found to be equal to the transfer signal obtained by moving forward the first transfer signal $\phi$1 for the period T on the time axis. Regarding the second transfer signal $\phi$2 after the period T(3), the waveform indicated by the dotted lines in the period T(1) and the waveform in the period T(2) are repeated. The reason why the waveform of the second transfer signal φ2 in the period T(1) differs from those of the period T(3) and the odd-numbered period T is that the period T(1) is a period in which the light-emitting component 10 starts operating.

A pair of the first and second transfer signals φ1 and φ2 sequentially turns ON the transfer thyristors T in numerical order so that ON/OFF control is performed for the VCSEL of the same number as the transfer thyristor T which is turned ON. This will be discussed later.

The ON signal φI1 sent to the φ1 terminal of the light-emitting component 10 will be explained below. The ON signal φI1 has two potentials ("H" (0 V) and "L" (−5 V)).

The ON signal φI1 will be explained by taking as an example the period T(1) for which the ON/OFF state of the VCSEL1 of the light-emitting component 10 is controlled. The ON signal φI1 is at "H" (0 V) at the start time b of the period T(1) and shifts from "H" (0 V) to "L" (−5 V) at time c. The ON signal φ1 then shifts from "L" to "H" at time d and remains at "H" at the end time e of the period T(1).

The operation of the light-emitting component 10 will be discussed below in accordance with the timing chart of FIG. 7 while referring to FIG. 1. An explanation will be given by taking as an example the periods T(1) and T(2) for which the ON/OFF state of the VCSEL1 and VCSEL2 is controlled.

(1) Time a

At time a, in the light-emitting component 10, the reference potential supplier 160 of the signal generating circuit 110 sets the reference potential Vsub to be "H" (0 V). The power supply potential supplier 170 sets the power supply potential Vgk to be "L" (−5 V). Then, the power supply line 200a of the light-emitting component 10 is made to have "H" (0 V), which is the level of the reference potential Vsub, and the Vsub terminal of the light-emitting component 10 is also made to have "H". Likewise, the power supply line 200b is made to have "L" (−5 V), which is the level of the power supply potential Vgk, and the Vgk terminal of the light-emitting component 10 is also made to have "L". Then, the power supply line 71 of the light-emitting component 10 is made to have "L".

The transfer signal generator 120 of the signal generating circuit 110 sets each of the first and second transfer signals φ1 and φ2 to be at "H" (0 V). The first and second transfer signal lines 201 and 202 are also made to have "H". This causes the φ1 terminal and the φ2 terminal of the light-emitting component 10 to be at "H". The potential of the first transfer signal line 72 connected to the φ1 terminal via the current limiting resistor R1 is also made to have "H", while that of the second transfer signal line 73 connected to the φ2 terminal via the current limiting resistor R2 is also made to have "H".

The ON signal generator 140 of the signal generating circuit 110 sets the ON signal φI1 to be at "H" (0 V). The ON signal line 204 is also made to have "H". This causes the φI terminal of the light-emitting component 10 to be at "H" via the current limiting resistor RI and also the ON signal line 75 connected to the φI terminal to be at "H" (0 V).

The anode (p-DBR layer 81) of the VCSEL is connected to the Vsub terminal which is set to be at "H".

The anode (p-DBR layer 81) of the transfer thyristor T is connected to the Vsub terminal which is set to be at "H".

The cathodes of the odd-numbered transfer thyristors T1, T3, T5, . . . are connected to the first transfer signal line 72 and are set to be at "H" (0 V). The cathodes of the even-numbered transfer thyristors T2, T4, T6, . . . are connected to the second transfer signal line 73 and are set to be at "H" (0 V). The transfer thyristor T is OFF with both anode and cathode set at "H".

The cathode terminal of the VCSEL is connected to the ON signal line 75 which is at "H" (0 V). The VCSEL is OFF with both anode and cathode set at "H".

As stated above, the gate Gt1 of the transfer thyristor T1 is connected to the cathode terminal of the start diode SD. The gate Gt1 is connected to the power supply line 71, which is set at the power supply potential Vgk ("L" (−5 V)), via the power supply line resistor Rg1. The anode terminal of the start diode SD is connected to the second transfer signal line 73 and is connected to the φ2 terminal, which is set at "H" (0 V), via the current limiting resistor R2. The start diode SD is thus forward biased. The potential of the cathode (gate Gt1) of the start diode SD is equal to the value (−1.5 V) obtained by subtracting the forward potential Vd (1.5 V) of the pn junction from the potential of the anode ("H" (0 V)) of the start diode SD. When the gate Gt1 is at −1.5 V, the anode (gate Gt1) of the coupling diode D1 is also at −1.5 V and the cathode is connected to the power supply line 71 ("L" (−5 V)) via the power supply line resistor Rg2. The coupling diode D1 is thus forward biased. The potential of the gate Gt2 is equal to the value (−3 V) obtained by subtracting the forward potential Vd (1.5 V) of the pn junction from the potential (−1.5 V) of the gate Gt1. The coupling diode D2 is forward biased since the anode (gate Gt2) is −3 V and the cathode is connected to the power supply line 71 ("L" (−5 V)) via the power supply line resistor Rg3. The potential of the gate Gt3 is thus −4.5 V obtained by subtracting the forward potential Vd (1.5 V) of the pn junction from the potential (−3 V) of the gate Gt2. However, the gates Gt4 through Gt128 are not influenced by the anode ("H" (0 V)) of the start diode SD, and the potential of the gates Gt4 through Gt128 is at "L" (−5 V), which is the potential of the power supply line 71.

Since the gate Gt is equal to the gate Gs, the potential of the gate Gs is the same as the gate Gt. The threshold voltage of the VCSEL and the transfer thyristor T is the value obtained by subtracting the forward potential Vd (1.5 V) of the pn junction from the potential of the gate Gt (gate Gs). That is, the threshold voltage of the transfer thyristor T1 is −3 V, that of the VCSEL2 and the transfer thyristor T2 is −4.5 V, that of the VCSEL3 and the transfer thyristor T3 is −6 V, and that of the VCSEL4 through VCSEL128 and the transfer thyristors T4 through T128 is −6.5 V.

(2) Time b

At time b in the timing chart of FIG. 7, the first transfer signal φ1 shifts from "H" (0 V) to "L" (−5 V). This causes the light-emitting component 10 to start operating.

When the first transfer signal φ1 has shifted from "H" to "L", the potential of the first transfer signal line 72 changes from "H" (0 V) to "L" (−5 V) via the φ1 terminal and the current limiting resistor R1. Since the voltage applied to the transfer thyristor T1 is −3.3 V, the transfer thyristor T1 having a threshold of −3 V is turned ON. As a result of the transfer thyristor T1 being turned ON, the potential of the first transfer signal line 72 becomes close to −3.2 V (negative potential having an absolute value greater than 3.2) obtained by subtracting the forward potential Vd (1.5 V) of the pn junction from the potential of the anode of the transfer thyristor T1.

The threshold voltage of the transfer thyristor T3 is −6 V, while that of the fifth and greater odd-numbered transfer thyristors T is −6.5 V. The voltage applied to the fifth and greater odd-numbered transfer thyristors T results in −1.5 V obtained by adding a voltage of 1.7 V applied to the VCSEL to −3.2 V. Hence, the fifth and greater odd-numbered transfer thyristors T are not turned ON.

The even-numbered transfer thyristors T are not turned ON because the second transfer signal φ2 is at "H" (0 V) and the second transfer signal line 73 is accordingly at "H" (0 V).

When the transfer thyristor T1 is turned ON, the potential of the gate Gt1/Gs1 is made to have "H" (0 V), which is the potential of the anode of the transfer thyristor T1. The potential of the gate Gt2 (gate Gs2) is −1.5 V, that of the gate Gt3 (gate Gs3) is −3 V, that of the gate Gt4 (gate Gs4) is −4.5 V, and the gate Gt5 (gate Gs5) through the gate Gt128 (gate Gs128) is at "L".

The threshold voltage of the VCSEL1 is −1.5 V, that of the transfer thyristor T2 and the VCSEL2 is −3 V, that of the transfer thyristor T3 and the VCSEL3 is −4.5 V, that of the transfer thyristor T4 and the VCSEL4 is −6 V, and that of the transfer thyristors T5 through T128 and the VCSEL5 through VCSEL128 is −6.5 V.

However, since the first transfer signal line 72 is at −1.5 V because of the ON-state transfer thyristor T1, the odd-numbered transfer thyristors T in the OFF state are not turned ON. The second transfer signal line 73 is at "H" (0 V), and the even-numbered transfer thyristors T are not turned ON. Since the ON signal line 75 is at "H" (0 V), none of the VCSELs are turned ON.

Immediately after time b, the transfer thyristor T1 is ON, while the other transfer thyristors T and VCSELs are OFF. "Immediately after time b, c, . . . " refers to a time when the state of an element such as the thyristor has become steady after the state is shifted due to a change in the potential of a corresponding signal line at time b, c, . . . .

(3) Time c

At time c, the ON signal φI1 shifts from "H" (0 V) to "L" (−5 V).

When the ON signal φI1 has shifted from "H" to "L", the potential of the ON signal line 75 changes from "H" (0 V) to "L" (−5 V) via the current limiting resistor RI and the φI terminal. Then, a voltage of −3.3 V obtained by adding a voltage of 1.7 V applied to the VCSEL to −5 V is applied to the VCSEL1. This turns ON the VCSEL1 having a threshold of −1.5 V and causes it to emit light (ON). As a result of the VCSEL1 emitting light, the potential of the ON signal line 75 becomes close to −3.2 V. Although the threshold voltage of the VCSEL2 is −3 V, the voltage applied to the VCSEL results in −1.5 V obtained by adding the voltage of 1.7 V applied to the VCSEL to −3.2 V. Hence, the VCSEL2 is not turned ON.

Immediately after time c, the transfer thyristor T1 and the VCSEL1 are in the ON state, and the VCSEL1 is in the light emission state (ON).

(4) Time d

At time d, the ON signal φI1 shifts from "L" (−5 V) to "H" (0 V).

When the ON signal φI1 has shifted from "L" to "H", the potential of the ON signal line 75 changes from −3.2 V to "H" via the current limiting resistor RI and the φI terminal. Then, the anode of the VCSEL1 is made to have "H". As a result, the VCSEL1 is turned OFF and stops emitting light (OFF). The period for which the VCSEL1 emits light is the period for which the VCSEL1 remains at "L", that is, the period from time c when the ON signal φI1 shifts from "H" to "L" until time d when the ON signal φI1 shifts from "L" to "H".

Immediately after time d, the transfer thyristor T1 is in the ON state.

(5) Time e

At time e, the second transfer signal φ2 shifts from "H" (0 V) to "L" (−5 V). At this time, the period T(1) for which the ON/OFF state of the VCSEL1 is controlled finishes, and the period T(2) for which the ON/OFF state of the VCSEL2 is controlled starts.

When the second transfer signal φ2 has shifted from "H" to "L", the potential of the second transfer signal line 73 changes from "H" to "L" via the φ2 terminal. As stated above, since the transfer thyristor T2 has a threshold of −3 V, it is turned ON.

As a result of the transfer thyristor T2 being turned ON, the potential of the gate Gt2/Gs2 is made to have "H" (0 V), that of the gate Gt3 (gate Gs3) is −1.5 V, that of the gate Gt4 (gate Gs4) is −3 V, that of the gate Gt5 (gate Gs5) is −4.5 V, and the gate Gt6 (gate Gs6) through the gate Gt128 (gate Gs128) is −5 V.

Immediately after time e, the transfer thyristors T1 and T2 are in the ON state.

(6) Time f

At time f, the first transfer signal φ1 shifts from "L" (−5 V) to "H" (0 V).

When the first transfer signal φ1 has shifted from "L" to "H", the potential of the first transfer signal line 72 changes from "L" to "H" via the φ1 terminal. Then, the anode and the cathode of the ON-state transfer thyristor T1 are both made to have "H" so that the transfer thyristor T1 is turned OFF.

Then, the potential of the gate Gt1 (gate Gs1) approaches the power supply potential Vgk ("L" (−5 V)) of the power supply line 71 via the power supply line resistor Rg1. As a result, the coupling diode D1 enters a reverse bias state in which a potential is applied in the direction in which a current does not flow. Hence, the gate Gt1 (gate Gs1) is no longer influenced by the state ("H" (0 V)) of the gate Gt2 (gate Gs2). That is, the threshold voltage of the transfer thyristor T having the gate Gt connected to the reverse-biased coupling diode D is −6.5 V, and even when the first transfer signal φ1 or the second transfer signal φ2 is made to have "L" (−5 V), this transfer thyristor T is not turned ON.

Immediately after time f, the transfer thyristor T2 is in the ON state.

(7) Other Times

At time g, when the ON signal φI1 shifts from "H" (0 V) to "L" (−5 V), the VCSEL2 starts to emit light (is turned ON), as in the VCSEL1 at time c.

Then, at time h, when the ON signal φI1 shifts from "L" (−5 V) to "H" (0 V), the VCSEL2 is turned OFF and stops emitting light (is turned OFF), as in the VCSEL 1 at time d.

Then, at time i, when the first transfer signal φ1 shifts from "H" (0 V) to "L" (−5 V), the transfer thyristor T3 having a threshold voltage of −3 V is turned ON, as in the transfer thyristor T1 at time b and the transfer thyristor T2 at time e. At time i, the period T(2) for which the ON/OFF state of the VCSEL2 is controlled finishes, and the period T(3) for which the ON/OFF state of the VCSEL3 is controlled starts.

Thereafter, the ON/OFF state of the VCSEL is controlled in a similar manner.

To stop the VCSEL from emitting light (keep the VCSEL at OFF), the ON signal φI is maintained at "H" (0 V), as in the ON signal φI1 in the period T(4) from time j to time k for which the ON/OFF state of the VCSEL4 is controlled, as shown in FIG. 7. Then, even when the threshold voltage of the VCSEL4 is −1.5 V, the VCSEL4 is not turned ON and remains OFF.

As described above, the gate terminals Gt of the transfer thyristors T are connected with each other via the corresponding coupling diodes D. When the potential of a gate Gt is changed, the potential of another gate Gt connected to this gate Gt via a forward-biased coupling diode D is also changed. This changes the threshold voltage of the transfer thyristor T having this gate Gt. If the threshold voltage of the transfer thyristor T is higher than −3.3 V (negative potential having an absolute value smaller than 3.3), the transfer thyristor T is turned ON at a timing when the first transfer signal ϕ1 or the second transfer signal ϕ2 shifts from "H" (0 V) to "L" (−5 V).

When the ON signal ϕ1 shifts from "H" (0 V) to "L" (−5 V), the VCSEL having the gate Gs connected to the gate Gt of the ON-state transfer thyristor T is turned ON and starts emitting light since the threshold of the VCSEL is −1.5 V.

That is, when the transfer thyristor T is turned ON, it specifies the VCSEL to be subjected to ON/OFF control (subject VCSEL), and the ON signal ϕ1 at "L" (−5 V) turns ON the subject VCSEL and causes it to emit light.

The ON signal ϕ1 at "H" (0 V) maintains the VCSEL at OFF and stops it from emitting light. That is, the ON signal ϕ1 sets the state of the VCSEL to be ON/OFF.

In this manner, the ON signal ϕ1 is set in accordance with image data, and the ON/OFF state of each VCSEL is controlled.

As described above, the light-emitting component 10 is formed as a self-scanning light-emitting array (self-scanning light-emitting device (SLED)).

In the light-emitting component 10 described above in detail, multiple light-emitting elements Hs formed into an array are operated to be turned ON/OFF in synchronization with each other.

In the above-described example, a VCSEL is used as a light-emitting element Hs. The light-emitting element Hs is not limited to a VCSEL and may be a light emitting thyristor, for example.

Although the current confinement layer is disposed in the p-DBR layer 81 or the p-gate layer 84 in the above-described example, it may be disposed in another layer, except for the light-emitting layer 83. However, the current confinement layer is desirably disposed in a p-type layer rather than an n-type layer, and is also desirably disposed in a layer close to the light-emitting layer 83.

MODIFIED EXAMPLE

In a modified example, the light-emitting component 10 is packaged and formed into a light-emitting chip C. Multiple light-emitting chips C are disposed in a row to form a light-emitting device 65.

Figure 8:
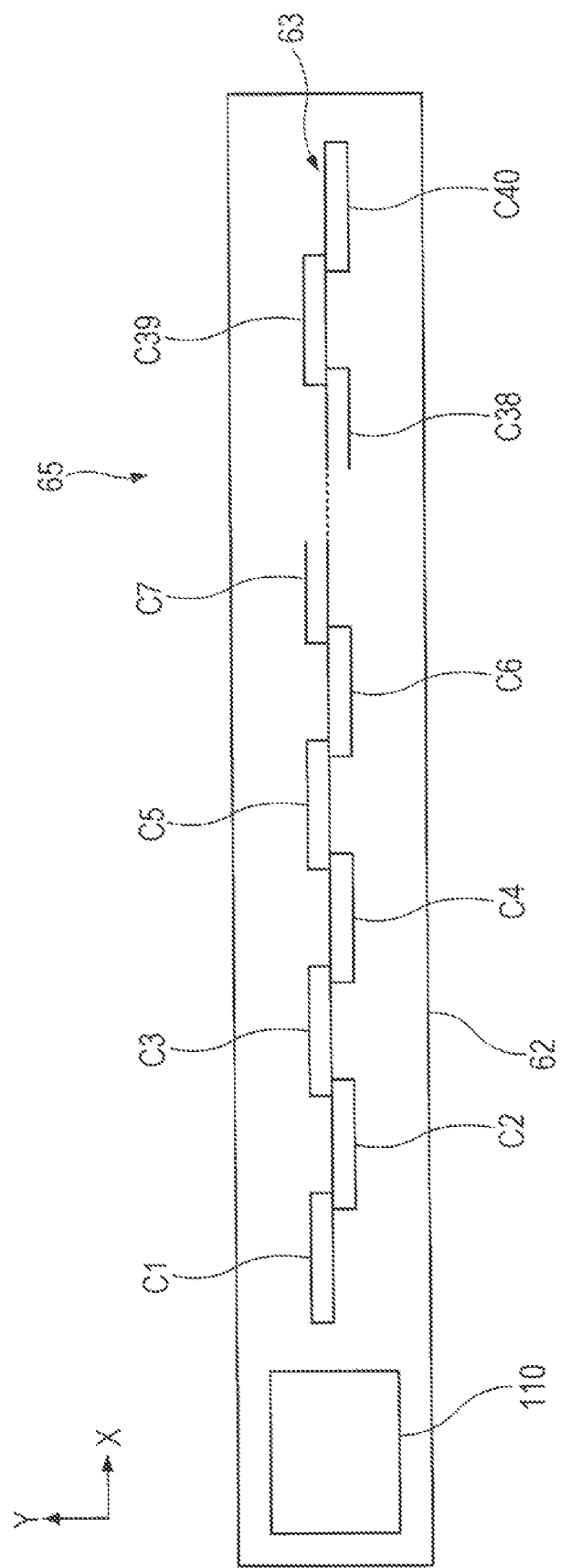
FIG. 8 is a top view illustrating an example of a light-emitting device including light-emitting chips using the light-emitting components.

FIG. 8 is a top view illustrating an example of the light-emitting device 65 including light-emitting chips C using the light-emitting components 10.

In the light-emitting device 65 shown in FIG. 8, as a light source 63, light-emitting chips C1 through C40 (which will be collectively called the light-emitting chips C unless it is necessary to distinguish them from each other) are disposed on a circuit substrate 62. More specifically, the light-emitting chips C are disposed in two rows in a staggered arrangement in the X direction. The light-emitting chips C1 through C40 are configured in the same manner. The light-emitting chips C1 through C40 are an example of forty light-emitting elements.

In the specification, the light-emitting chips C1 through C40 are arranged in numerical order.

Although the forty light-emitting chips C are used in the modified example, the number of light-emitting chips C is not limited to forty.

The light-emitting device 65 includes a signal generating circuit 110, which drives the light-emitting chips C. The signal generating circuit 110 is an example of a driver that inputs and outputs a signal for driving the light-emitting chips C. The signal generating circuit 110 is constituted by an integrated circuit (IC), for example. The light-emitting device 65 may not necessarily include the signal generating circuit 110. Instead, the signal generating circuit 110 may be provided outside the light-emitting device 65 and supply a control signal for controlling the light-emitting chips C via a cable, for example. A description will be given below, assuming that the light-emitting device 65 includes the signal generating circuit 110.

Figure 9:
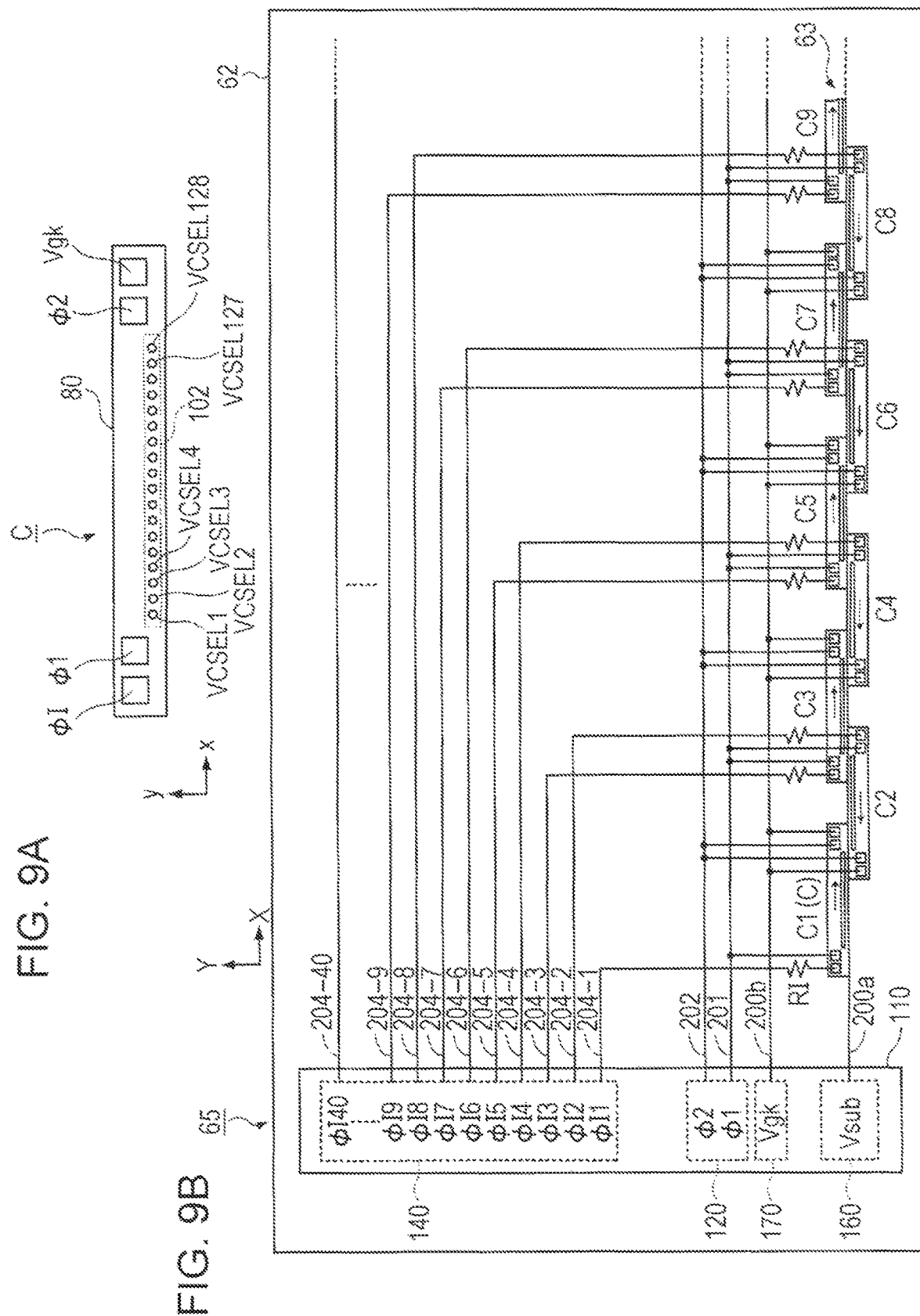
FIG. 9A illustrates an example of the configuration of a light-emitting chip.
FIG. 9B illustrates an example of the configuration of a signal generating circuit of the light-emitting device and also an example of wiring (lines) on a circuit substrate.

FIG. 9A illustrates an example of the configuration of the light-emitting chip C. FIG. 9B illustrates an example of the configuration of the signal generating circuit 110 of the light-emitting device 65 and also an example of wiring (lines) on the circuit substrate 62. In FIG. 9B, among the light-emitting chips C1 through C40, the light-emitting chips C1 through C9 are only shown.

The configuration of the light-emitting chip C shown in FIG. 9A will first be explained.

The light-emitting chip C includes a light-emitting portion 102. The light-emitting portion 102 includes VCSELs (VCSEL1 through VCSEL128) disposed in a row near and along a long side on the front surface of a substrate 80 formed in a rectangular shape. The plural VCSELs are an example of a light-emitting component array including light-emitting components disposed in a row in a main scanning direction. The light-emitting chip C also includes plural terminals (ϕ1 terminal, ϕ2 terminal, Vgk terminal, and ϕI terminal) at both sides of the substrate 80 in the longitudinal direction on the front surface of the substrate 80. The terminals are bonding pads for receiving various control signals, for example. The terminals are arranged in order of the ϕI terminal and ϕ1 terminal from one side of the substrate 80 and in order of the Vgk terminal and ϕ2 terminal from the other side of the substrate 80. The light-emitting portion 102 is disposed between the ϕ1 terminal and the ϕ2 terminal. On the back surface of the substrate 80, a back-surface electrode 89 (see FIG. 2B), which serves as a Vsub terminal, is disposed. On the front surface of the substrate 80, the arrangement direction of the VCSEL1 through VCSEL128 is set to be the x direction, while the direction perpendicular to the x direction is set to be the y direction.

"Being disposed in a row" is not restricted to the state in which the VCSELs are aligned as shown in FIG. 9A, and may be a state in which the VCSELs are displaced from each other in the direction perpendicular to the row direction. For example, the individual VCSELs may be disposed by an amount of displacement in the direction perpendicular to the row direction. Alternatively, the VCSELs may be disposed in a zigzag manner at every other VCSELs or at a group of multiple VCSELs.

The configuration of the signal generating circuit 110 and that of the wiring (lines) on the circuit substrate 62 of the light-emitting device 65 will now be discussed below with reference to FIG. 9B.

As stated above, on the circuit substrate 62 of the light-emitting device 65, the signal generating circuit 110 and the light-emitting chips C1 through C40 are mounted, and the wiring (lines) for connecting the signal generating circuit 110 and the light-emitting chips C1 through C40 is arranged.

The configuration of the signal generating circuit 110 will first be explained.

Various items of data and control signals are input into the signal generating circuit 110. The signal generating circuit 110 rearranges the items of data and adjusts the amount of light in accordance with the received data and control signals.

The signal generating circuit 110 includes a transfer signal generator 120 that sends a first transfer signal φ1 and a second transfer signal φ2 to the light-emitting chips C1 through C40, based on the various control signals.

The signal generating circuit 110 also includes an ON-signal generator 140 that sends ON signals φI1 through φI40 (simply called ON signals φI unless it is necessary to distinguish them from each other) to the light-emitting chips C1 through C40, respectively, based on the various control signals.

The signal generating circuit 110 also includes a reference potential supplier 160 and a power supply potential supplier 170. The reference potential supplier 160 supplies a reference potential Vsub, which serves as a reference of the potential, to the light-emitting chips C1 through C40. The power supply potential supplier 170 supplies a power supply potential Vgk to the light-emitting chips C1 through C40 to drive them.

The arrangement of the light-emitting chips C1 through C40 will be discussed below.

The odd-numbered light-emitting chips C1, C3, C5, . . . are disposed in a row at certain intervals in the direction along the long sides of the corresponding substrates 80. The even-numbered light-emitting chips C2, C4, C6, . . . are also disposed in a row at certain intervals in the direction along the long sides of the corresponding substrates 80. The odd-numbered light-emitting chips C1, C3, C5, . . . and the even-numbered light-emitting chips C2, C4, C6, . . . are disposed in a staggered arrangement. More specifically, the even-numbered light-emitting chips C2, C4, C6, . . . are located at positions at which the odd-numbered light-emitting chips C1, C3, C5, . . . are rotated by 180° and vice versa so that the long sides of the light-emitting portions 102 of the odd-numbered light-emitting chips C and those of the even-numbered light-emitting chips C oppose each other. In each of the light-emitting chips C, the VCSELs are arranged at predetermined intervals in the main scanning direction (X direction). In each of the light-emitting chips C1 through C40 shown in FIG. 9B, the arrangement direction of the VCSELs (the numerical order of VCSEL1 through VCSEL128) forming the light-emitting portion 102 shown in FIG. 9A is indicated by the arrow in FIG. 9B.

The wiring (lines) for connecting the signal generating circuit 110 and the light-emitting chips C1 through C40 will be described below.

A power supply line 200a is laid on the circuit substrate 62. The power supply line 200a is connected to the back-surface electrode 89 (see FIG. 2B), which serves as the Vsub terminal, provided on the back surface of the substrate 80 of each light-emitting chip C, and is used for supplying the reference potential Vsub from the reference potential supplier 160 to the back-surface electrode 89.

A power supply line 200b is also laid on the circuit substrate 62. The power supply line 200b is connected to the Vgk terminal provided on each light-emitting chip C, and is used for supplying the power supply potential Vgk from the power supply potential supplier 170 to the light-emitting chip C to drive it.

A first transfer signal line 201 and a second transfer signal line 202 are also laid on the circuit substrate 62. The first transfer signal line 201 is used for supplying the first transfer signal φ1 from the transfer signal generator 120 to the φ1 terminal of each of the light-emitting chips C1 through C40. The second transfer signal line 202 is used for supplying the second transfer signal φ2 from the transfer signal generator 120 to the φ2 terminal of each of the light-emitting chips C1 through C40. The first and second transfer signals φ1 and φ2 are sent in parallel to all the light-emitting chips C1 through C40.

ON signal lines 204-1 through 204-40 (simply called the ON signal lines 204 unless it is necessary to distinguish them from each other) are also laid on the circuit substrate 62. The ON signal lines 204-1 through 204-40 respectively supply the ON signals φI1 through φI40 from the ON-signal generator 140 to the φ1 terminals of the light-emitting chips C1 through C40 via respective current limiting resistors RI.

As discussed above, the reference potential Vsub and the power supply potential Vgk are supplied to all the light-emitting chips C1 through C40 on the circuit substrate 62. The first and second transfer signals φ1 and φ2 are also sent in parallel to all the light-emitting chips C1 through C40. In contrast, the ON signals φI1 through φI40 are individually sent to the light-emitting chips C1 through C40, respectively.

(Optical Measurement Apparatus 1)

The above-described light-emitting device 65 may be used for optical measurement.

Figure 10:
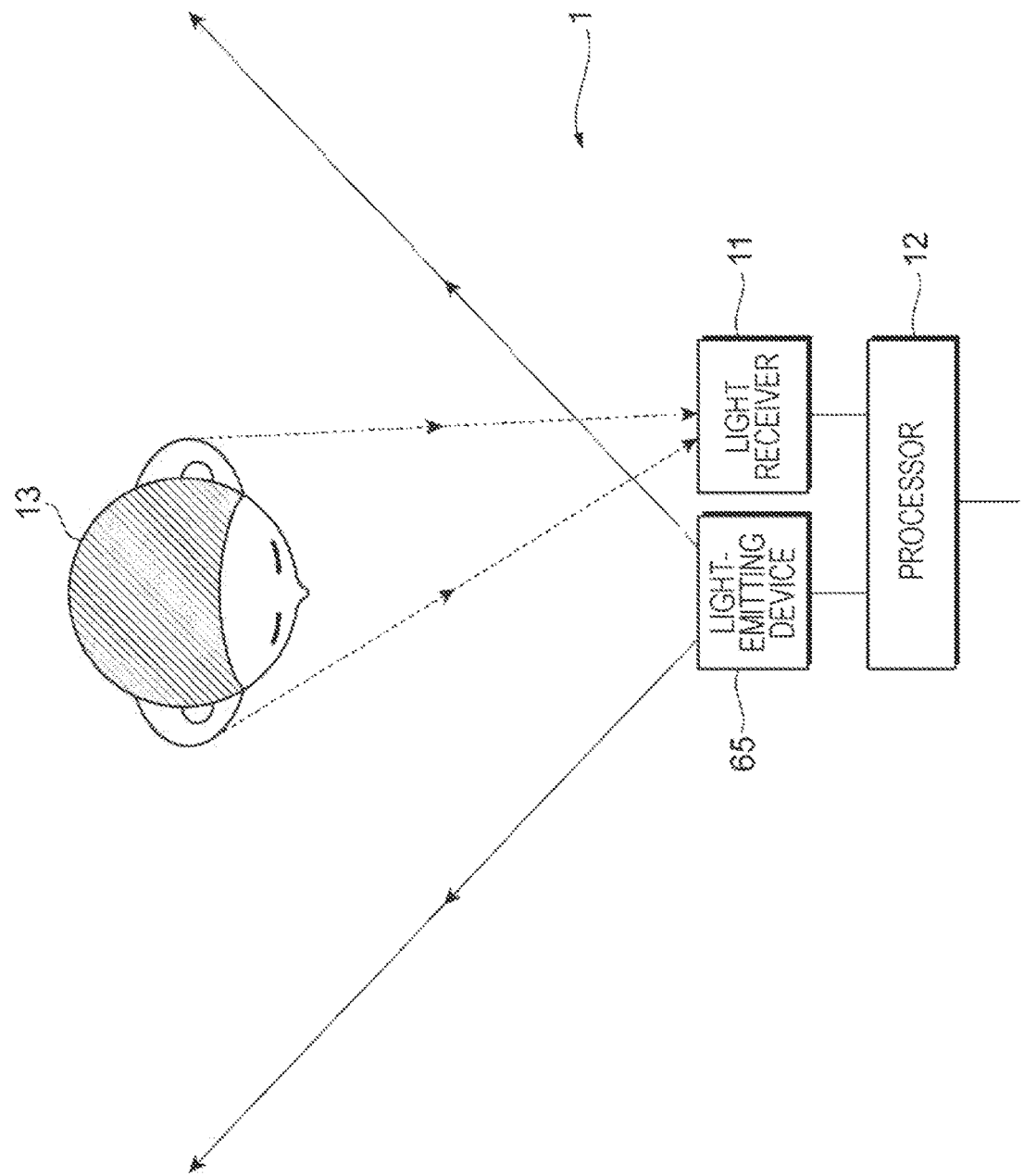
FIG. 10 illustrates an optical measurement apparatus using the light-emitting device.

FIG. 10 illustrates an optical measurement apparatus 1 using the light-emitting device 65.

The optical measurement apparatus 1 includes the above-described light-emitting device 65, a light receiver 11 that receives light, and a processor 12 that processes data. A subject 13 to be measured is placed to oppose the optical measurement apparatus 1. In FIG. 10, the subject 13 is a human. In FIG. 10, the optical measurement apparatus 1 and the subject 13 are shown as viewed from above.

The light-emitting device 65 switches ON the VCSELs, as discussed above, and causes the VCSELs to emit light linearly in the left-right direction in FIG. 10, as indicated by the solid lines, while vertically moving the light irradiation direction. That is, the light-emitting device 65 applies light to scan the subject 13.

The light receiver 11 receives light reflected by the subject 13. The light receiver 11 receives light returning from the subject 13 toward the light receiver 11, as indicated by the broken lines. The light receiver 11 is typically an imaging device that receives light in a two-dimensional direction.

The processor 12 is formed as a computer including an input/output unit that inputs and outputs data. The processor 12 processes information regarding light so as to calculate the distance to the subject 13 and/or a three-dimensional configuration of the subject 13.

The processor 12 performs control to drive the light-emitting device 65 to emit light. Then, based on a time difference between a timing (time) at which the light-emitting device 65 has emitted light and a timing (time) at which the light receiver 11 has received light reflected by the subject 13, the processor 12 calculates the optical path length of light which is emitted from the light-emitting device 65 and is reflected by the subject 13 and has reached the light receiver 11. The positions of the light-emitting device 65 and the light receiver 11 and the interval therebetween are preset. The processor 12 thus measures (calculates) the distance from the light-emitting device 65 or the light receiver 12 or the distance from a reference point to the subject 13. The reference point is a point located at a predetermined position separated from the light-emitting device 65 or the light receiver 11.

The above-described measurement approach is a method based on the time difference between the emission of light and returning to a sensor and is called a time-of-flight (TOF) method.

Applying this method to plural points on the subject 13 can measure a three-dimensional configuration of the subject 13. As described above, the subject 13 is irradiated with light emitted from the light-emitting device 65. Light reflected by a portion of the subject 13 closer to the light-emitting device 65 returns to the light receiver 11 earlier. If an imaging device that receives light in a two-dimensional direction is used as the light receiver 11, bright spots are recorded on portions of two-dimensional frame images where reflected light is received. Based on bright spots recorded on the two-dimensional frame images, the optical path length from a corresponding portion of the subject 13 to each bright spot is calculated. Then, the distances from the light-emitting device 65 or the light receiver 11 or the distances from the reference point to the individual portions of the subject 13 are calculated. That is, the three-dimensional configuration of the subject 13 is calculated.

The above-described optical measurement apparatus 1 may be used for calculating a distance to an object and also for calculating the configuration of the object so as to identify it. The optical measurement apparatus 1 may also be used for calculating the configuration of a face so as to perform facial recognition. The optical measurement apparatus 1 may also be installed in a vehicle to detect obstacles positioned ahead, behind, and sides of the vehicle. In this manner, the optical measurement apparatus 1 is widely applicable to distance calculation and configuration calculation.

(Image Forming Apparatus 2)

The above-described light-emitting device 65 may be used for image formation.

Figure 11:
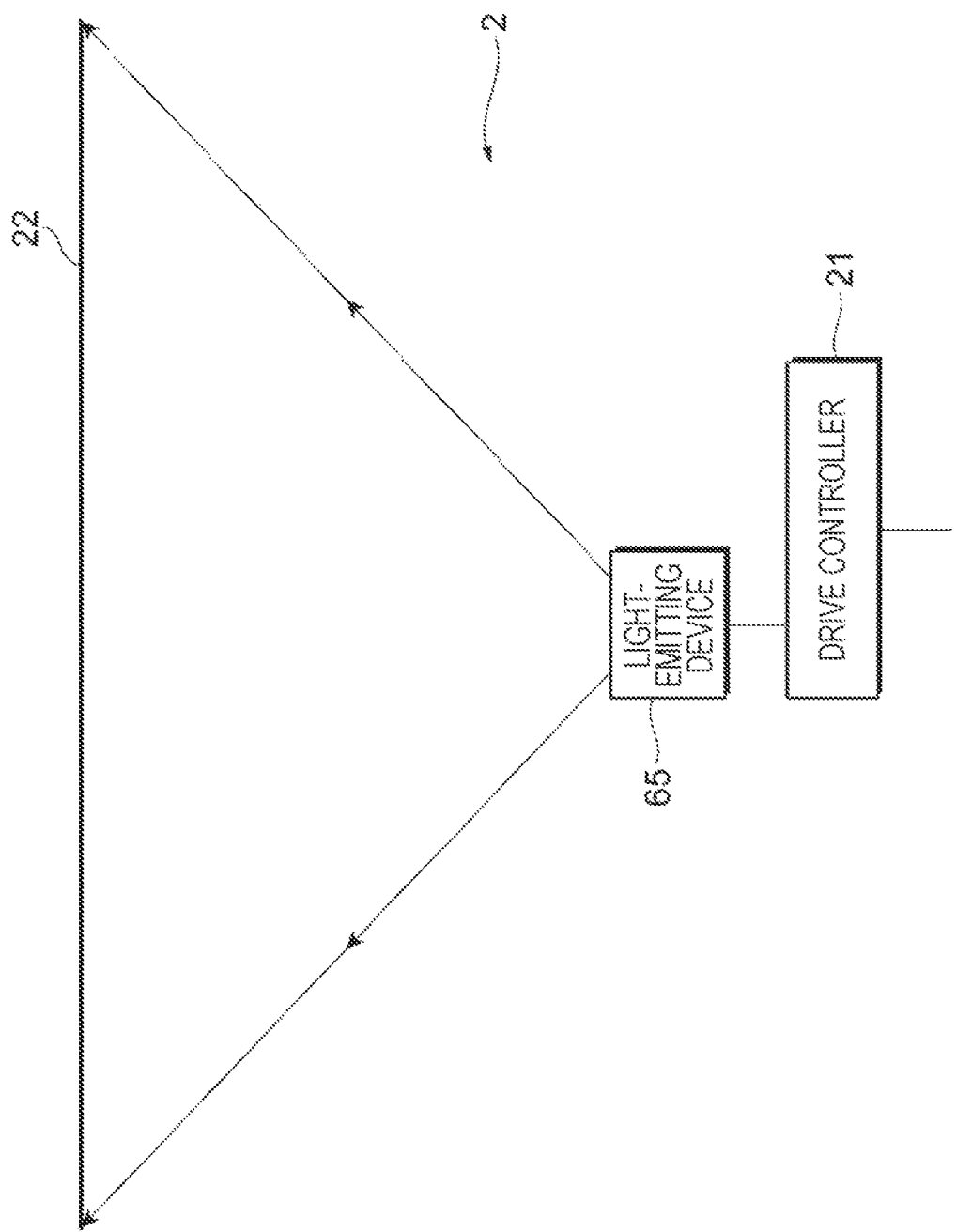
FIG. 11 illustrates an image forming apparatus using the light-emitting device.

FIG. 11 illustrates an image forming apparatus 2 using the light-emitting device 65.

The image forming apparatus 2 includes the above-described light-emitting device 65, a drive controller 21, and a screen 22 that receives light.

The operation of the image forming apparatus 2 will be described below.

The light-emitting device 65 switches the VCSELs to be ON/OFF, as discussed above, and causes the VCSELs to emit light linearly in the left-right direction, as indicated by the solid lines in FIG. 11, while vertically moving the light irradiation direction. That is, the light-emitting device 65 applies light to scan the screen 22. As a result, a two-dimensional still image (two-dimensional image) is generated. The drive controller 21 receives an image signal and drives the light-emitting device 65 to form a two-dimensional image based on the image signal. The drive controller 21 sets an ON-retaining period as a frame and sequentially rewrites frames, thereby generating a two-dimensional video image. Two-dimensional still images and video images generated in this manner are projected on the screen 22.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A light-emitting component comprising:
    a substrate; and
    a plurality of light-emitting elements that are disposed on the substrate and emit light in a direction intersecting with a surface of the substrate and that are switched ON/OFF together, wherein
    the plurality of light-emitting elements include a gate layer, the gate layer performing control so that the plurality of light-emitting elements are switched ON/OFF together, a film thickness of the gate layer being greater than a wavelength of light emitted from the plurality of light-emitting elements;
    the plurality of light-emitting elements have a layer structure including layers forming a thyristor and a light-emitting layer, the light-emitting layer being disposed between layers of the thyristor so as to emit light;
    a lower gate layer forming the layers of the thyristor is continuously provided between the plurality of light-emitting elements as a common layer and serves as the gate layer; and
    an upper p-type layer and an upper n-type layer forming the layers of the thyristor are each divided between the plurality of light-emitting elements.

2. The light-emitting component according to claim 1, further comprising:
    a gate electrode that is electrically connected to the gate layer of the plurality of light-emitting elements.

3. The light-emitting component according to claim 2, wherein the gate layer is continuously provided between the plurality of light-emitting elements as a common layer.

4. The light-emitting component according to claim 1, wherein part of an upper portion of the lower gate layer is divided between the plurality of light-emitting elements.

5. The light-emitting component according to claim 4, wherein, as a result of the part of the upper portion of the lower gate layer being divided between the plurality of light-emitting elements, the divided upper portion of the lower gate layer serves as a current confinement layer in which a current flowing through the light-emitting layer is confined.

6. The light-emitting component according to claim 1, wherein:
    each of the plurality of light-emitting elements is a vertical cavity surface emitting laser; and
    a film thickness of a length from a top surface of an upper gate layer to a bottom surface of a lower gate layer, the upper gate layer and the lower gate layer forming the layers of the thyristor, is a multiple of an integer of a wavelength of light emitted from the plurality of light-emitting elements, the integer being two or greater.

7. The light-emitting component according to claim 1, wherein a plurality of holes are disposed to surround each of the plurality of light-emitting elements.

8. The light-emitting component according to claim 7, wherein the gate layer and a topmost layer which form the layers of the thyristor are each continuously provided as a common layer between the plurality of light-emitting elements via the plurality of holes.

9. The light-emitting component according to claim 8, wherein the thyristor includes a current confinement layer, the current confinement layer being oxidized via the plurality of holes so as to confine a current flowing through the light-emitting layer.

10. The light-emitting component according to claim 1, wherein the gate layer has an inverted T shape.

11. The light-emitting component according to claim 10, wherein a current confinement layer is provided in a protruding portion of the inverted T shape of the gate layer, a current flowing through a light-emitting layer of the plurality of light-emitting elements being confined in the current confinement layer.

12. A light-emitting element array chip comprising:
a light-emitting component array that includes light-emitting components disposed in a row in a main scanning direction, each of the light-emitting components being the light-emitting component according to claim 1; and
a driver that inputs and outputs a signal for driving the light-emitting components.

13. An optical measurement apparatus comprising:
the light-emitting component according to claim 1;
a light receiver that receives light which is emitted from the light-emitting component and is reflected by a subject; and
a processor that processes information regarding the light received by the light receiver so as to measure a distance from the light-emitting component to the subject or to measure a configuration of the subject.

14. A light-emitting component comprising:
a substrate; and
a plurality of light-emitting elements that are disposed on the substrate and emit light in a direction intersecting with a surface of the substrate and that are switched ON/OFF together, wherein
the plurality of light-emitting elements include a gate layer, the gate layer performing control so that the plurality of light-emitting elements are switched ON/OFF together, a film thickness of the gate layer being greater than a wavelength of light emitted from the plurality of light-emitting elements;
the plurality of light-emitting elements have a layer structure including layers forming a thyristor and a light-emitting layer, the light-emitting layer being disposed between layers of the thyristor so as to emit light;
each of the plurality of light-emitting elements is a vertical cavity surface emitting laser; and
a film thickness of a length from a top surface of an upper gate layer to a bottom surface of a lower gate layer, the upper gate layer and the lower gate layer forming the layers of the thyristor, is a multiple of an integer of a wavelength of light emitted from the plurality of light-emitting elements, the integer being two or greater.

* * * * *